United States Patent
Sudo

(10) Patent No.: US 6,724,423 B1
(45) Date of Patent: Apr. 20, 2004

(54) VIDEO CAMERA AND VIDEO CAMERA SYSTEM

(75) Inventor: Fumihiko Sudo, Kanagawa (JP)

(73) Assignee: Sony Corporation, Tokyo (JP)

(*) Notice: Subject to any disclaimer, the term of this patent is extended or adjusted under 35 U.S.C. 154(b) by 1187 days.

(21) Appl. No.: 08/667,459

(22) Filed: Jun. 21, 1996

(30) Foreign Application Priority Data

Jun. 23, 1995 (JP) .......................................... 07-157817

(51) Int. Cl.$^7$ ................................................. H04N 9/73
(52) U.S. Cl. .................................... 348/188; 348/223.1
(58) Field of Search ........................... 348/223.1, 225.1, 348/228.1, 227, 259, 262, 187, 188

(56) References Cited

U.S. PATENT DOCUMENTS

| 4,414,573 A | * | 11/1983 | Griesshaber et al. ........ 358/163 |
| 4,608,593 A | * | 8/1986 | Miyaji et al. ................. 358/10 |
| 5,189,511 A | * | 2/1993 | Parulski et al. ............... 358/80 |
| 5,260,774 A | * | 11/1993 | Takayama ..................... 358/29 |
| 5,668,596 A | * | 9/1997 | Vogel .......................... 348/222 |

* cited by examiner

Primary Examiner—Wendy R. Garber
Assistant Examiner—Jacqueline Wilson
(74) Attorney, Agent, or Firm—Frommer Lawrence & Haug LLP; William S. Frommer; Bruno Polito

(57) ABSTRACT

A video camera system capable of matching colors between configured video cameras by effectively reducing color differences therebetween. A red, a green and a blue signal from imaging devices are amplified by preamplifiers and video amplifiers before being fed to a color matching circuit. The color matching circuit performs color matching in accordance with the levels of the red, green and blue signals using variables of gains and DC offset values. The gains and DC offset values are determined by the color matching circuit executing predetermined operation expressions. With a plurality of colors imaged in advance by the video cameras to be matched in color with a reference video camera, necessary coefficients of the operation expressions are obtained by use of the level measurements (tristimulus values) of the red, green and blue signals from an integrating circuit of each camera. Executing the operation expressions thus obtained allows the matching circuit to absorb the color differences between the reference video camera on the one hand, and the video camera to be matched in color therewith on the other hand.

6 Claims, 8 Drawing Sheets

VIDEO CAMERA AND VIDEO CAMERA SYSTEM

BACKGROUND OF THE INVENTION

1. Field of the Invention

The present invention relates to a video camera and a video camera system. More particularly, the invention relates to a video camera and a video camera system capable of reducing color differences between the innovative video cameras that make up the system by adjusting their gains and DC offset values in keeping with the red, green and blue signals obtained through imaging operation.

2. Description of the Related Art

FIG. 9 is a schematic view outlining the constitution of a conventional video camera. In FIG. 9, a light source 1 illuminates an object 2. The light coming from the object 2 through an imaging lens 3 enters an optical filter 4 such as a CC (color conversion) filter or ND (neutral density) filter, and an IR (infrared) cut filter 5. Past the filter, the incident light is fed to a color separation prism 6 for separation into red, green and blue light components which are led to CCD solid state image sensing devices 7R, 7G and 7B respectively. On the imaging planes of the image sensing devices 7R, 7G and 7B, the red, green and blue images of the object 2 are focused for imaging. The image sensing devices 7R, 7G and 7B output signals that are amplified by amplifiers 8R, 8G and 8B respectively. The outputs from the amplifiers provide red, green and blue signals R, G and B as tristimulus values.

FIG. 10A shows a typical spectral distribution characteristic $I(\lambda)$ of the camera input integrating the reflectance ratio of the illuminated object 2 and other relevant factors. FIG. 10B graphically illustrates typical spectral distribution characteristics $r(\lambda)$, $g(\lambda)$ and $b(\lambda)$ integrating the properties of the optical filter 4, IR cut filter 5, color separation prism 6, and imaging devices 7R, 7G and 7B. If the gains of the amplifiers 8R, 8G and 8B are represented by $A_r$, $A_g$ and $A_b$, the tristimulus values R, G and B are given by the following equations (1):

$$R=A_r\int I(\lambda)r(\lambda)d\lambda$$
$$G=A_g\int I(\lambda)g(\lambda)d\lambda$$
$$B=A_b\int I(\lambda)b(\lambda)d\lambda \quad (1)$$

Suppose that a plurality of video cameras constitute a video camera system. In this system, each of the tristimulus values R, G and B needs to be the same between the component video cameras so that the system may absorb color differences between the cameras for color matching.

Consider a case where two video cameras take pictures of the same object. For this setup, it is assumed that the spectral distribution of one of the video cameras is represented by $r_1(\lambda)$, $g_1(\lambda)$ and $b_1(\lambda)$, and that of the other video camera by $r_2(\lambda)$, $g_2(\lambda)$ and $b_2(\lambda)$. It is also assumed that the gains of the amplifiers 7R, 7G and 7B in one video camera are designated by $A_{r1}$, $A_{g1}$, and $A_{b1}$, respectively, and those of the corresponding amplifiers in the other video camera by $A_{r2}$, $A_{g2}$ and $A_{b2}$ respectively. In that case, the tristimulus values $R_1$, $G_1$ and $B_1$ of one video camera are given by the equations (2) below, and the tristimulus values $R_2$, $G_2$ and $B_2$ Of the other video camera are expressed by the following equations (3):

$$R_1=A_{r1}\int I(\lambda)r_1(\lambda)d\lambda$$
$$G_1=A_{g1}\int I(\lambda)g_1(\lambda)d\lambda$$
$$B_1=A_{b1}\int I(\lambda)b_1(\lambda)d\lambda \quad (2)$$
$$R_2=A_{r2}\int I(\lambda)r_2(\lambda)d\lambda$$
$$G_2=A_{g2}\int I(\lambda)g_2(\lambda)d\lambda$$
$$B_2=A_{b2}\int I(\lambda)b_2(\lambda)d\lambda \quad (3)$$

To make the tristimulus values $R_1$, $G_1$ and $B_1$ of one video camera match the corresponding tristimulus values $R_2$, $G_2$ and $B_2$ Of the other video camera for color matching requires using at least three variables. In one example, the levels of the tristimulus values $R_2$, $G_2$ and $B_2$ would be adjusted by use of six variables, i.e., gains $G_r$, $G_g$ and $G_b$, and DC offset values $O_r$, $O_g$ and $O_b$ in the equations (4) below. The adjustments would provide tristimulus values $R_2'$, $G_2'$ and $B_2'$ matching the tristimulus values $R_1$, $G_1$ and $B_1$.

$$R'_2=G_rR_2+O_r$$
$$G'_2=G_gG_2+O_g$$
$$B'_2=G_bB_2+O_b \quad (4)$$

However, one disadvantage of conventional video cameras is that their gains and DC offset values (black level) are fixed. This makes it impossible to match the tristimulus values of a plurality video cameras constituting a video camera system; color differences between different video cameras within a system cannot be absorbed thereby for color matching.

OBJECT AND SUMMARY OF THE INVENTION

It is therefore an object of the present invention to provide a video camera and a video camera system capable of absorbing the color differences between a plurality of such video cameras making up the system in order to ensure appropriate color matching between the component cameras.

In carrying out the invention and according to one aspect thereof, there is provided a video camera comprising: level detecting means for detecting the levels of a red, a green and a blue signal obtained through imaging operation; and color matching means for adjusting the gains and/or the DC current offset values of the red, green and blue signals in accordance with those levels of the red, green and blue signals which are detected by the level detecting means.

According to another aspect of the invention, there is provided a video camera system comprising a plurality of video cameras and a controller. Each of the plurality of video cameras includes level detecting means for detecting the levels of a red, a green and a blue signal obtained through imaging operation; and color matching means for adjusting the gains and/or the DC current offset values of the red, green and blue signals. The controller controls the operation of the color matching means of the plurality of video cameras in accordance with those levels of the red, green and blue signals which are detected by the level detecting means.

The color matching means of each video camera adjusts the gains and/or DC offset values of the red, green and blue signals. Where a plurality of video cameras making up a video camera system acquire their respective red, green and blue signals through imaging operation, the gains and/or DC offset values of these red, green and blue signals are adjusted in accordance with the levels of the signals, whereby the color differences between the component video cameras within the system are absorbed.

Other objects, features and advantages of the present invention will become apparent in the following specification and accompanying drawings.

DESCRIPTION OF THE PREFERRED EMBODIMENT

Figure 1:
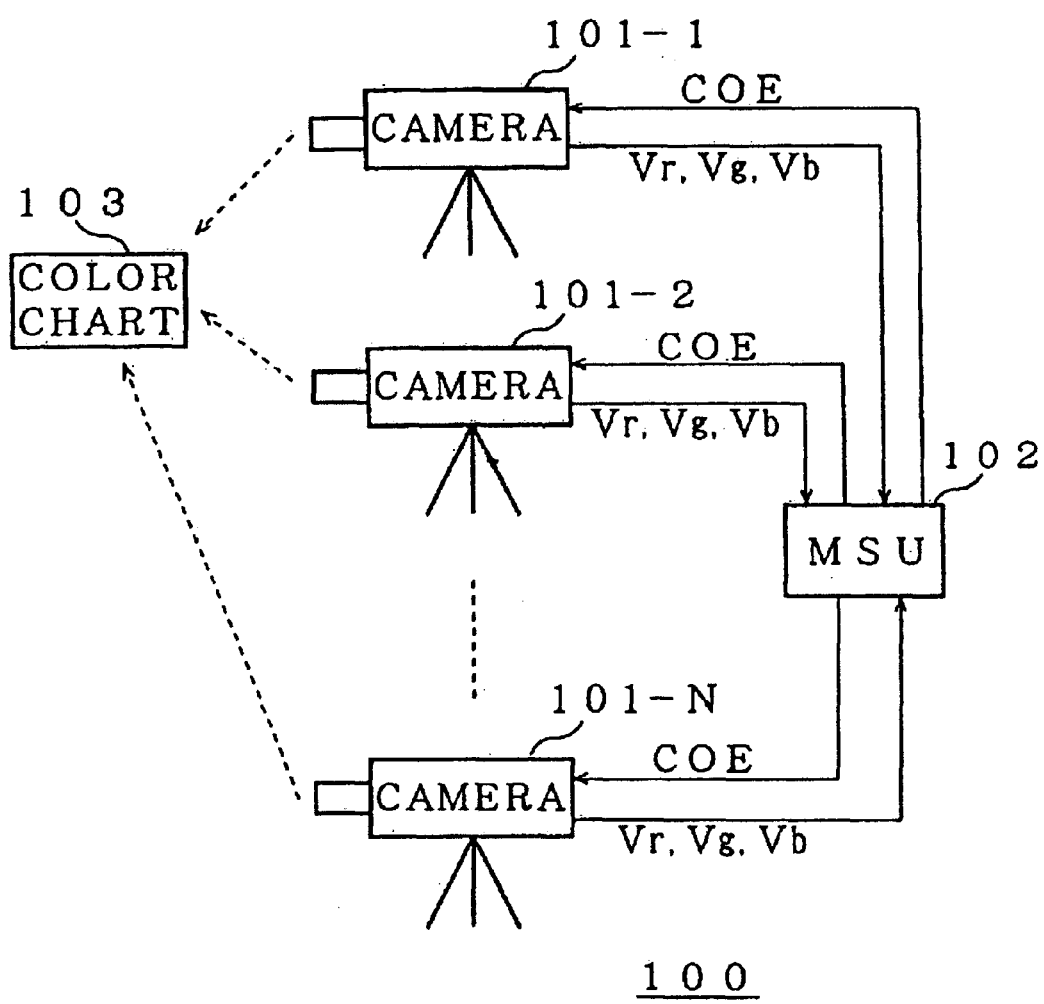
FIG. 1 is a schematic view of a video camera system practiced as one preferred embodiment of the invention.

The preferred embodiment of the invention will now be described with reference to the accompanying drawings. FIG. 1 shows a video camera system $100$ practiced as the preferred embodiment of the invention. The video camera system $100$ comprises N video cameras $101_{-1}$ through $101_{-N}$ (N is an integer of at least 2) and a master setup unit (called the MSU hereunder) $102$ acting as a controller. The video cameras $101_{-1}$ through $101_{-N}$ and the MSU $102$ are interconnected by communication lines. The video cameras $101_{-1}$ through $101_{-N}$ are each equipped with a color matching circuit for adjusting the gains and DC offset values (black level) of the red, green and blue signals obtained through imaging operation.

The video cameras $101_{-1}$ through $101_{-N}$ supply the MSU $102$ with level measurements Vr, Vg and Vb of the red, green and blue signals obtained through imaging operation of each video camera. The MSU $102$ feeds each of the video cameras $101_{-1}$ through $101_{-N}$ with a plurality of color matching coefficients COE. The color matching coefficients COE are computed illustratively on the basis of the level measurements Vr, Vg and Vb taken by the configured video cameras $101_{-1}$ through $101_{-N}$ imaging a plurality of colors by use of a common color chart $103$ such as Macbeth Color Checker™, as will be described later.

In the above constitution, the video camera system $100$ executes color matching in the manner described below, illustratively so that the tristimulus values of the video cameras $101_{-2}$ through $101_{-N}$ will match those of the video camera $101_{-1}$.

That is, using the common color chart $103$, the video cameras $101_{-1}$ through $101_{-N}$ first image a plurality of colors. The MSU $102$ computes the color matching coefficients COE to be used by the color matching circuits of the video cameras $101_{-1}$ through $101_{-N}$ in accordance with the level measurements Vr, Vg and Vb fed from each video camera.

The color matching coefficients COE supplied to the video camera $101_{-1}$ are computed so that the gain for the red, green and blue signals to be adjusted by the color matching circuit will be 1 and their DC offset value will be 0. The color matching coefficients COE fed to the video cameras $101_{-2}$ through $101_{-N}$ are computed so as to provide necessary gains and DC offset values for the red, green and blue signals to be adjusted by the respective color matching circuits, such that the tristimulus values of the video cameras $101_{-2}$ through $101_{-N}$ match those of the video camera $101_{-1}$.

The color matching coefficients computed as described by the MSU $102$ are supplied to and set for the color matching circuits of the video cameras $101_{-1}$ through $101_{-N}$ so that their red, green and blue signals are adjusted in gain and DC offset value. This provides color matching allowing the tristimulus values of the video cameras $101_{-2}$ through $101_{-N}$ to match those of the video camera $101_{-1}$.

Figure 2:
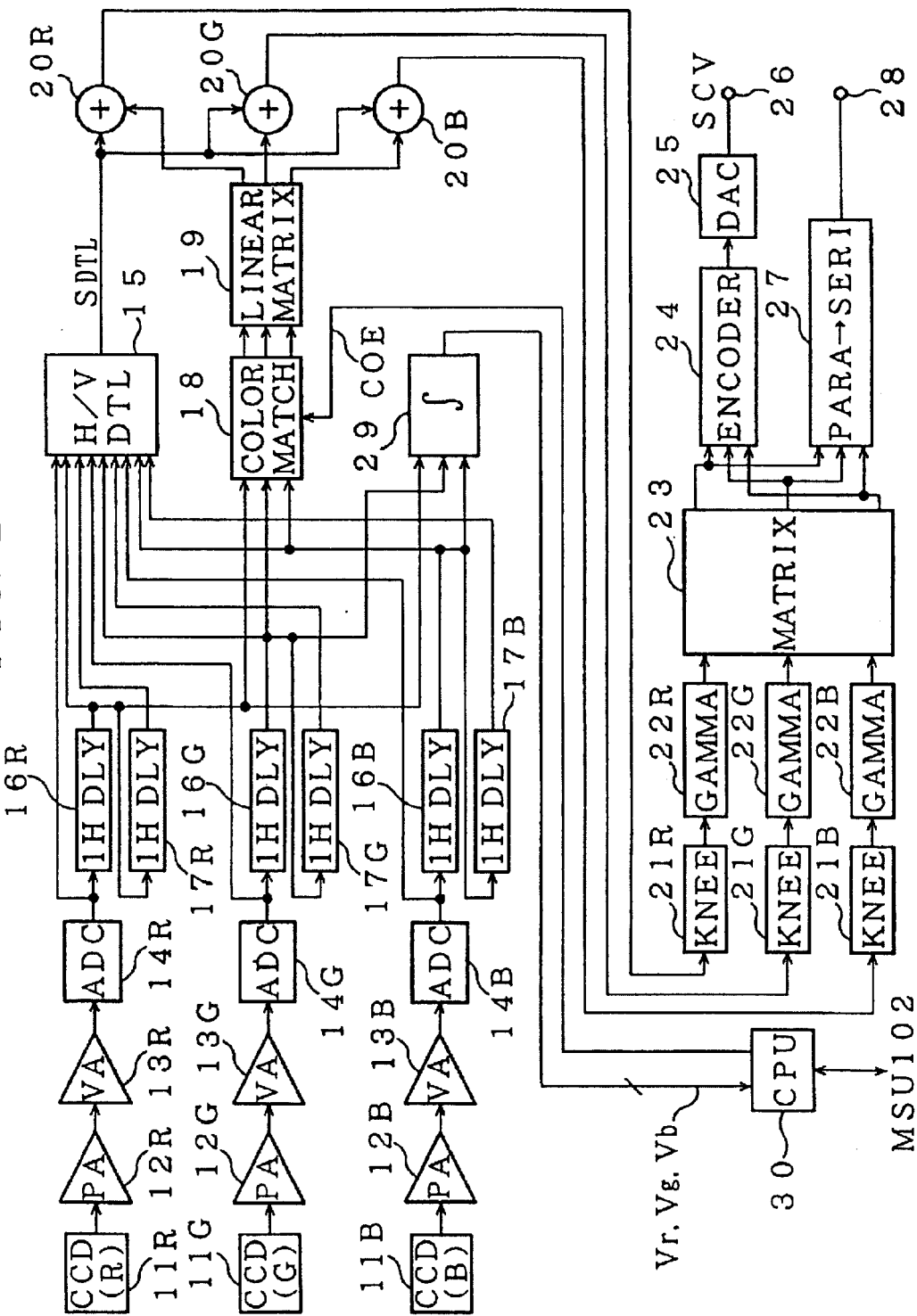
FIG. 2 is a schematic flow diagram showing the circuit constitution of a video camera included in the embodiment.

FIG. 2 illustrates the circuit constitution of any one of the video cameras $101_{-1}$ through $101_{-N}$. In FIG. 2, CCD solid state imaging devices 11R, 11G and 11B output red, green and blue signals to preamplifiers 12R, 12G and 12B respectively. The amplified outputs of the preamplifiers 12R, 12G and 12B are fed to video amplifiers 13R, 13G and 13B respectively. The video amplifiers 13R, 13G and 13B cause the red, green and blue signals to match therebetween in terms of black and white levels.

The red, green and blue signals from the video amplifiers 13R, 13G and 13B are converted to digital signals by A/D converters 14R, 14G and 14B respectively. The digital signals are then fed to a horizontal/vertical contour enhancement signal generating circuit (called the detail circuit) 15. The red, green and blue signals from the A/D converters 14R, 14G and 14B are also sent to a series circuit made up of delay circuits 16R and 17R, to another series circuit composed of delay circuits 16G and 17G, and to another series circuit constituted by delay circuits 16B and 17B. The delay circuits 16R, 16G, 16B, 17R, 17G and 17B each provide a delay time corresponding to one horizontal period (1H).

The delay circuits 16R, 16G and 16B output red, green and blue signals each delayed by one horizontal period, and the delay circuits 17R, 17G and 17B output red, green and blue signals delayed by two horizontal periods each. These signals are fed to the detail circuit (contour enhancement signal generating circuit) 15. Given the red, green and blue signals corresponding to three horizontal periods, the detail circuit 15 generates horizontal and vertical contour enhancement signals and adds these enhancement signals together to form a contour enhancement signal $S_{DTL}$.

The red, green and blue signals output by the delay circuits 16R, 16G and 16B and delayed by one horizontal period each are supplied to a color matching circuit 18. The color matching circuit 18 also receives the color matching coefficient COE sent as described from the MSU $102$ over a communication line by way of a CPU (central processing unit) 30 constituting part of the system controller. Given the signals and the coefficient, the color matching circuit 18 adjusts the gains and/or the DC offset values of the red, green and blue signals, as will be described later. The red, green and blue signals output by the color matching circuit 18 are sent to a linear matrix circuit 19. The linear matrix circuit 19 electronically corrects any color reproduction error arising from the difference between the imaging characteristic of the color video camera and the ideal imaging characteristic of the NTSC format.

As will be described later, the contour enhancement signal $S_{DTL}$ is commonly added to the red, green and blue signals. Since it is irrelevant to colors, the signal $S_{DTL}$ is extracted upstream of the color matching circuit 18 of the embodiment. Carrying out in parallel both the extraction of the contour enhancement signal $S_{DTL}$ and the color matching with the color matching circuit 18 provides the benefit of reducing the overall delay amount.

The red, green and blue signals from the linear matrix circuit 19 are supplied respectively to adders 20R, 20G and 20B whereby the contour enhancement signal $S_{DTL}$ is added to the signals. The signals thus supplemented are sent to knee circuits 21R, 21G and 21B. The knee circuits 21R, 21G and 21B compress the high-intensity components of the received signals so as to expand the apparent dynamic range. The red, green and blue signals output by the knee circuits 21R, 21G and 21B are fed to gamma correction circuits 22R, 22G and 22B wherein the signals are multiplied by the inverse function of the voltage-luminance characteristic of the image receiving tube in use. The red, green and blue signals thus multiplied are sent to a matrix circuit 23.

The matrix circuit 23 subjects the red, green and blue signals to matrix processing so as to acquire a luminance signal, a red color difference signal and a blue color difference signal. The luminance signal, red color difference signal and blue color difference signal from the matrix circuit 23 are supplied to an encoder 24. In turn, the encoder 24 carries out color modulation, attaching of a synchronous signal, and addition of luminance and color signals, thereby forming a color image signal SCV in the NTSC, PAL or other format. The color image signal SCV from the encoder 24 is converted by a D/A converter 25 to an analog signal that is led to an output terminal 26. The luminance signal, red color difference signal and blue color difference signal are also converted by a parallel/serial converter 27 into serial video data that is sent to an output terminal 28.

The red, green and blue signals from the delay circuits 16R, 16G and 16B are fed to an integrating circuit 29 for integration whereby the level measurements Vr, Vg and Vb of the red, green and blue signals are obtained. The level measurements Vr, Vg and Vb from the integrating circuit 29 are sent via the CPU 30 to the MSU 102 over a communication line.

As mentioned in connection with the equations (4) above, the color matching circuit 18 adjusts the levels of the tristimulus values R, G and B using six variables, i.e., the gains $G_r$, $G_g$ and $G_b$, and the DC offset values $O_r$, $O_g$ and $O_b$. Although the spectral distribution of the imaging segment of the system could be measured in advance, it is practically impossible to measure the spectral distribution of the lighting and the object simultaneously during imaging in order to perform integral operations of the equations (2) and (3), before adjusting the variables in the equations (4) for color matching. A more practical method involves obtaining beforehand functional relations such as those of the equations (5) and (6) below, so that the variables consisting of the gains $G_r$, $G_g$ and $G_b$ and of the DC offset values $O_r$ $O_g$ and $O_b$ are adjusted according to the tristimulus values $R_2$, $G_2$ and $B_2$. It should be noted that the tristimulus values do not correspond to the spectral distribution on a one-to-one basis; the method above provides only an approximation.

$G_r = f_{gr}(R_2, G_2, B_2)$ $G_g = f_{gg}(R_2, G_2, B_2)$ $G_b = f_{gb}(R_2, G_2, B_2)$ (5)

$O_r = f_{or}(R_2, G_2, B_2)$ $O_g = f_{og}(R_2, G_2, B_2)$ $O_b = f_{ob}(R_2, G_2, B_2)$ (6)

Suppose that the brightness of the camera input is multiplied by a factor of k for the equations (2) and (3). In that case, the spectral distribution of the camera input is given as $kI(\lambda)$. The tristimulus values $R_1'$, $G_1'$ and $B_1'$ as well as $R_2'$, $G_2'$ and $B_2'$ of each video camera are then expressed by the equations (7) and (8) below. That is, when brightness is multiplied by k, each of the tristimulus values is simply multiplied by k as well.

$R_1' = A_{r1} \int kI(\lambda) r_1(\lambda) d\lambda = kR_1$ $G_1' = A_{g1} \int kI(\lambda) g_1(\lambda) d\lambda = kG_1$ $B_1' = A_{b1} \int kI(\lambda) b_1(\lambda) d\lambda = kB_1$ (7)

$R_2' = A_{r2} \int kI(\lambda) r_2(\lambda) d\lambda = kR_2$ $G_2' = A_{g2} \int kI(\lambda) g_2(\lambda) d\lambda = kG_2$ $B_2' = A_{b2} \int kI(\lambda) b_2(\lambda) d\lambda = kB_2$ (8)

Thus if the terms of brightness are eliminated from parameters regarding the gains $G_r$, $G_g$ and $G_b$ in the equations (5), it is possible to determine color matching variables using two parameters. However, simply obtaining the ratios (R/G, B/G, etc.) of the components making up the tristimulus value vector (R, G, B) is difficult to achieve. This is because the domain involved stretches from zero to infinity.

Figure 3:
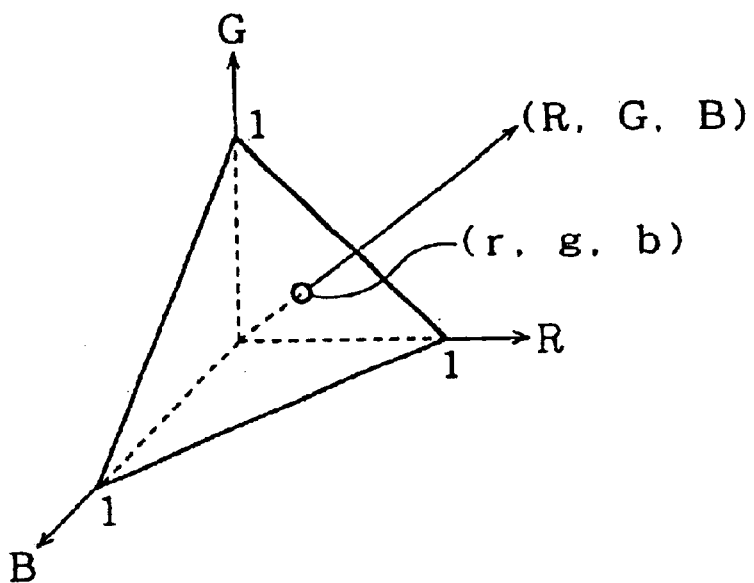
FIG. 3 is a view of a two-dimensional display of color light.

This embodiment envisages expressing the colors of the tristimulus values by use of the tristimulus value vector (R, G, B) and the coordinates (r, g, b) of a point of intersection with a plane R+G+B=1, as shown in FIG. 3. If the length is not sufficient, an extension is used to find those coordinates (r, g, b) of an intersection point which are given by the following equations (9):

$$r = \frac{R}{R+G+B}, g = \frac{G}{R+G+B}, b = \frac{B}{R+G+B} \quad (9)$$

Figure 4:
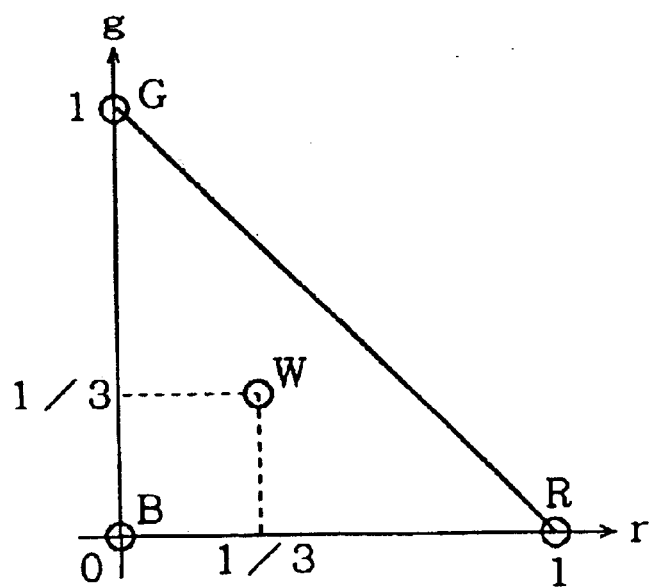
FIG. 4 is a view of an rg chromaticity diagram.

Since r+g+b=1, one parameter may be eliminated, and two parameters (r, g) may be used to express color. Such color representation is generally called rg chromaticity. As shown in FIG. 4, the R axis in the color space of the tristimulus values corresponds to (r, g)=(1, 0), the G axis to (r, g)=(0, 1), the B axis to (r, g)=(0, 0), and a black-and-white point W to (r, g)=(⅓, ⅓). It follows that the variables of the gains $G_r$, $G_g$ and $G_b$ in the equations (4) can be determined using two parameters r and g, as shown in the following equations $G_r = f_{gr}(r, g)$ $G_g = f_{gg}(r, g)$ $G_b = f_{gb}(r, b)$ (10)

Below is a description of specific circuit constitution examples of the color matching circuit 18 and the color matching coefficients COE associated therewith. Consider first a case where the color matching circuit 18 performs the processing defined by the equations (11) below. The equations (11) have the gains $G_r$, $G_g$ and $G_b$ expressed by linear equations of r and g, with the DC offset values $O_r$, $O_g$ and $O_b$ regarded as zero. In this case, the error squared $E^2$ is given by the equation (12) below.

$$R'=(C_0 r+C_1 g+C_2)R$$
$$G'=(C_3 r+C_4 g+C_5)G$$
$$B'=(C_6 r+C_7 g+C_8)B$$

$$r = \frac{R}{R+G+B}, \quad g = \frac{G}{R+G+B} \quad (11)$$

$$E^2 = \{R'-(C_0 r+C_1 g+C_2)R\}^2 + \{G'-(C_3 r+C_4 g+C_5)G\}^2 + \{B'-(C_6 r+C_7 g+C_8)B\}^2 \quad (12)$$

Coefficients $C_0$ through $C_8$ in the equations (11) above are acquired for each of the video cameras that need to be matched in color. Specifically, to obtain the coefficients requires measuring a plurality of combinations of the tristimulus values (R', G', B') of the reference video camera and the tristimulus values (R, G, B) of the video cameras to be matched in color through imaging of a plurality of colors by use of the color chart 103 as described. The coefficients $C_0$ through $C_8$ thus obtained are such as to minimize the total sum ($\Sigma E^2$) of the errors squared $E^2$ in the measurements. In this case, the equations (13) below must hold on the basis of the method of least squares. These partial differential equations are reduced to three sets of simultaneous linear equations (14) through (16) below with three unknowns each. Solving the equations (14) through (16) gives the coefficients $C_0$ through $C_8$.

$$\frac{\partial \sum E^2}{\partial C_0}=0, \frac{\partial \sum E^2}{\partial C_1}=0, \frac{\partial \sum E^2}{\partial C_2}=0$$
$$\frac{\partial \sum E^2}{\partial C_3}=0, \frac{\partial \sum E^2}{\partial C_4}=0, \frac{\partial \sum E^2}{\partial C_5}=0 \quad (13)$$
$$\frac{\partial \sum E^2}{\partial C_6}=0, \frac{\partial \sum E^2}{\partial C_7}=0, \frac{\partial \sum E^2}{\partial C_8}=0$$

$$\begin{cases} \sum R^2 r^2 C_0 + \sum R^2 rg C_1 + \sum R^2 r C_2 = \sum R'Rr \\ \sum R^2 rg C_0 + \sum R^2 g^2 C_1 + \sum R^2 g C_2 = \sum R'Rg \\ \sum R^2 r C_0 + \sum R^2 g C_1 + \sum R^2 C_2 = \sum R'R \end{cases} \quad (14)$$

$$\begin{cases} \sum G^2 r^2 C_3 + \sum G^2 rg C_4 + \sum G^2 r C_5 = \sum G'Gr \\ \sum G^2 rg C_3 + \sum G^2 g^2 C_4 + \sum G^2 g C_5 = \sum G'Gg \\ \sum G^2 r C_3 + \sum G^2 g C_4 + \sum G^2 C_5 = \sum G'G \end{cases} \quad (15)$$

$$\begin{cases} \sum B^2 r^2 C_6 + \sum B^2 rg C_7 + \sum B^2 r C_8 = \sum B'Br \\ \sum B^2 rg C_6 + \sum B^2 g^2 C_7 + \sum B^2 g C_8 = \sum B'Bg \\ \sum B^2 r C_6 + \sum B^2 g C_7 + \sum B^2 C_8 = \sum B'B \end{cases} \quad (16)$$

For this embodiment, it is assumed that the video camera 101$_{-1}$ is the reference video camera and that the video cameras 101$_{-2}$ through 101$_{-N}$ are the cameras to be matched in color with the reference video camera. The level measurements (Vr, Vg, Vb) output by the integrating circuit 29 of the video camera 101$_{-1}$ are regarded as the tristimulus values (R', G', B') of the reference video camera, and the level measurements (Vr, Vg, Vb) output by the integrating circuit 29 in each of the video cameras 101$_{-2}$ through 101$_{-N}$ are taken as the tristimulus values (R, G, B) of the video cameras to be matched in color.

The CPU included in the MSU 102 (see FIG. 1) acquires the coefficients $C_0$ through $C_8$ by solving the three sets of simultaneous linear equations (14) through (16) above with three unknowns each. The coefficients $C_0$ through $C_8$ computed by the MSU 102 for the video cameras 101$_{-2}$ through 101$_{-N}$ are each supplied as the color matching coefficients COE to the color matching circuit 18 in each of the video cameras 101$_{-2}$ through 101$_{-N}$. The reference video camera 101$_{-1}$ is fed both with 1 representing the coefficients $C_2$, $C_5$ and $C_8$, and with 0 denoting the other coefficients.

Figure 5:
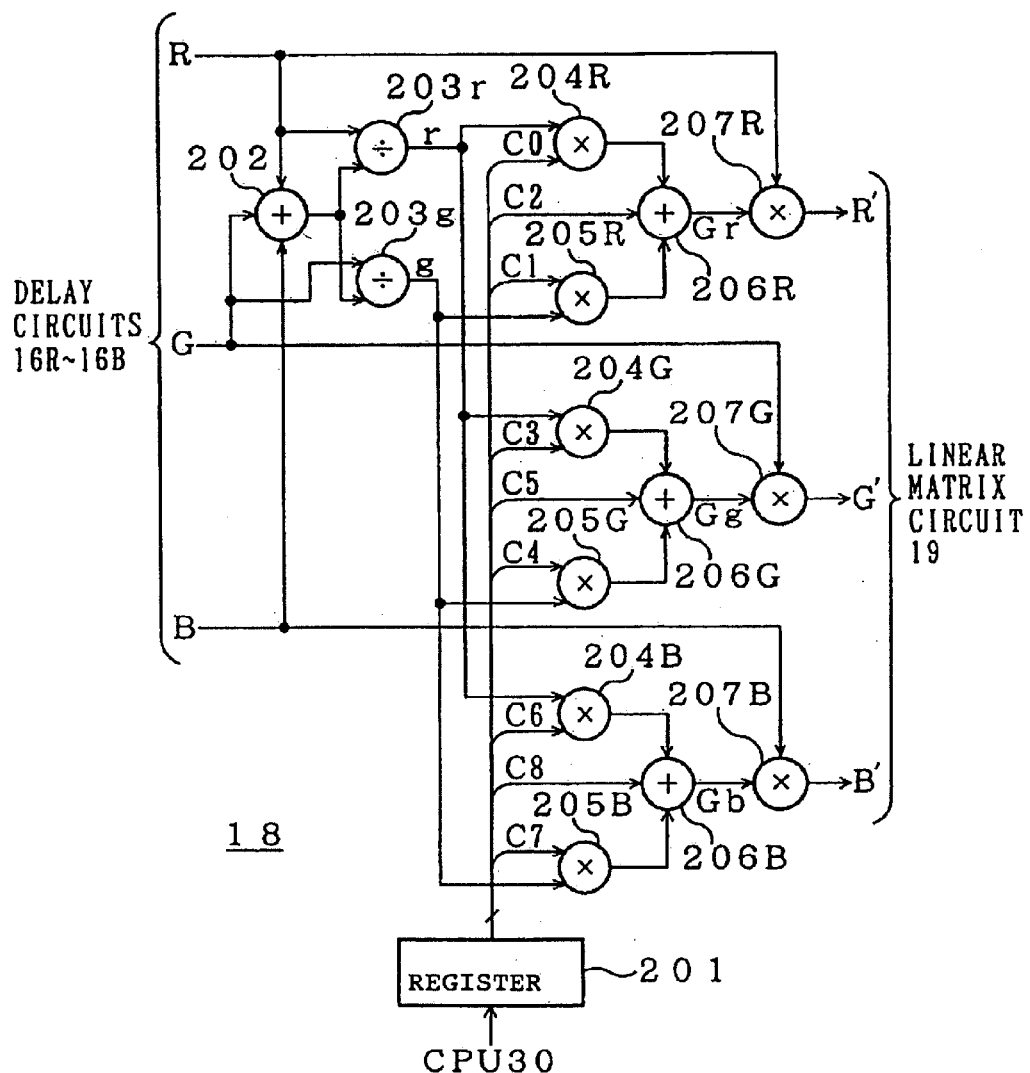
FIG. 5 is a circuit diagram of a first circuit constitution example of the color matching circuit in the video camera.

FIG. 5 is a circuit diagram of the first circuit constitution example of the color matching circuit 18 to which the equations (11) are applied. In FIG. 5, a register 201 retains the color coefficients COE ($C_0$–$C_8$) supplied from the MSU 102 past the CPU 30 (see FIG. 2) over a communication line.

The red signal R, green signal G and blue signal B from the delay circuits 16R, 16G and 16B (see FIG. 2) are fed to an adder 202 for addition. The red signal R and the output signal (R+G+B) of the adder 202 are sent to a divider 203r which in turn generates a signal r. The green signal G and the output signal (R+G+B) of the adder 202 are supplied to a divider 203g which generates a signal g.

The signal r from the divider 203r is sent to multipliers 204R, 204G and 204B whereby the coefficients $C_0$, $C_3$ and $C_6$ from the register 201 are multiplied respectively. The signal g from the divider 203g is forwarded to multipliers 205R, 205G and 205B whereby the coefficients $C_1$, $C_4$ and $C_7$ from the register 201 are multiplied respectively.

The output signals of the multipliers 204R and 205R are fed to an adder 206R for addition. The added result in the adder is supplemented by the coefficient $C_2$ from the register 201, whereby the gain $G_r$ is obtained. The red signal R from the delay circuit 16R is sent to a multiplier 207R. The multiplier 207R multiplies the red signal R by the gain $G_r$ from the adder 206R, thereby producing an output red signal R'.

The output signals of the multipliers 204G and 205G are fed to an adder 206G for addition. The added result in the adder is supplemented by the coefficient $C_5$ from the register 201, whereby the gain $G_g$ is acquired. The green signal G from the delay circuit 16G is sent to a multiplier 207G. The multiplier 207G multiplies the green signal G by the gain $G_g$ from the adder 206G, thereby producing an output green signal G'.

In like manner, the output signals of the multipliers 204B and 205B are fed to an adder 206B for addition. The added result in the adder is supplemented by the coefficient $C_8$ from the register 201, whereby the gain $G_b$ is obtained. The blue signal B from the delay circuit 16B is sent to a multiplier 207B. The multiplier 207G multiplies the blue signal B by the gain $G_b$ from the adder 206B, thereby generating an output blue signal B'.

As described, the color matching circuit 18 of FIG. 5 adjusts the gains of the red, green and blue signals through the processing defined by the equations (11). The adjustments allow the system to absorb the color differences of the video cameras 101$_{-2}$ through 101$_{-N}$ relative to the reference video camera 101$_{-1}$ in the color matching operation.

Consider next a case where the color matching circuit 18 performs the processing defined by the equations (17) below. The equations (17) regard the gains $G_r$, $G_g$ and $G_b$ as 1 and have the DC offset values $O_r$, $O_g$ and $O_b$ expressed by linear equations of R, G and B. It will be appreciated that the tristimulus values (R, G, B) can be used as described with respect to the DC offset values $O_r$, $O_g$ and $O_b$ because of the need for brightness terms with three parameters. The coefficients $C_3$, $C_7$ and $C_{11}$ maybe omitted because they are unnecessary as long as the proper black balance is maintained. As with the equations (12) and (13), it will be understood that the coefficients $C_0$ through $C_{11}$ for minimizing the errors involved using the method of least squares are obtained by solving three sets of simultaneous linear equations (18) through (20) below with four unknowns each.

$$R'=R+C_0R+C_1G+C_2B+C_3$$

$$G'=G+C_4G+C_5R+C_6B+C_7$$

$$B'=B+C_8B+C_9R+C_{10}G+C_{11} \quad (17)$$

$$\begin{cases} \sum R^2 C_0 + \sum RGC_1 + \sum BRC_2 + \sum RC_3 = \sum R(R'-R) \\ \sum RGC_0 + \sum G^2 C_1 + \sum GBC_2 + \sum GC_3 = \sum G(R'-R) \\ \sum BRC_0 + \sum GBC_1 + \sum B^2 C_2 + \sum BC_3 = \sum B(R'-R) \\ \sum RC_0 + \sum GC_1 + \sum BC_2 + \sum C_3 = \sum (R'-R) \end{cases} \quad (18)$$

$$\begin{cases} \sum G^2 C_4 + \sum RGC_5 + \sum GBC_6 + \sum GC_7 = \sum G(G'-G) \\ \sum RGC_4 + \sum R^2 C_5 + \sum BRC_6 + \sum RC_7 = \sum R(G'-G) \\ \sum GBC_4 + \sum BRC_5 + \sum B^2 C_6 + \sum BC_7 = \sum B(G'-G) \\ \sum GC_4 + \sum RC_5 + \sum BC_6 + \sum C_7 = \sum (G'-G) \end{cases} \quad (19)$$

$$\begin{cases} \sum B^2 C_8 + \sum BRC_9 + \sum GBC_{10} + \sum BC_{11} = \sum B(B'-B) \\ \sum BRC_8 + \sum R^2 C_9 + \sum RGC_{10} + \sum RC_{11} = \sum R(B'-B) \\ \sum GBC_8 + \sum RGC_9 + \sum G^2 C_{10} + \sum GC_{11} = \sum G(B'-B) \\ \sum BC_8 + \sum RC_9 + \sum GC_{10} + \sum C_{11} = \sum B(B'-B) \end{cases} \quad (20)$$

Where the coefficients $C_3$, $C_7$ and $C_{11}$ are omitted, the equations (17) above are reduced to the equations (21) below. The coefficients $C_0$ through $C_2$, coefficients $C_4$ through $C_6$, and coefficients $C_8$ through $C_{10}$ are obtained respectively by solving three sets of simultaneous linear equations (22) through (24) below with three unknowns each.

$$R'=R+C_0R+C_1G+C_2B$$

$$G'=G+C_4G+C_5R+C_6B$$

$$B'=B+C_8B+C_9R+C_{10}G \quad (21)$$

$$\begin{cases} \sum R^2 C_0 + \sum RGC_1 + \sum BRC_2 = \sum R(R'-R) \\ \sum RGC_0 + \sum G^2 C_1 + \sum GBC_2 = \sum G(R'-R) \\ \sum BRC_0 + \sum GBC_1 + \sum B^2 C_2 = \sum B(R'-R) \end{cases} \quad (22)$$

$$\begin{cases} \sum G^2 C_4 + \sum RGC_5 + \sum GBC_6 = \sum G(G'-G) \\ \sum RGC_4 + \sum R^2 C_5 + \sum BRC_6 = \sum R(G'-G) \\ \sum GBC_4 + \sum BRC_5 + \sum B^2 C_6 = \sum B(G'-G) \end{cases} \quad (23)$$

$$\begin{cases} \sum B^2 C_8 + \sum BRC_9 + \sum GBC_{10} = \sum B(B'-B) \\ \sum BRC_8 + \sum R^2 C_9 + \sum RGC_{10} = \sum R(B'-B) \\ \sum GBC_8 + \sum RGC_9 + \sum G^2 C_{10} = \sum G(B'-B) \end{cases} \quad (24)$$

It is the CPU in the MSU 102 (see FIG. 1) that solves either the three sets of simultaneous linear equations (18) through (20) with four unknowns each, to find the coefficients $C_0$ through $C_{11}$, or the three sets of simultaneous linear equations (22) through (24) with three unknowns each, to obtain the coefficients $C_0$ through $C_2$, $C_4$ through $C_6$ and $C_8$ through $C_{10}$. Either the coefficients $C_0$ through $C_{11}$, or the coefficients $C_0$ through $C_2$, $C_4$ through $C_6$ and $C_8$ through $C_{10}$, all computed by the MSU 102 for the video cameras $101_{-2}$ through $101_{-N}$, are supplied as the color matching coefficients COE to the color matching circuit 18 in each of these video cameras. The reference video camera $101_{-1}$ is fed with 0 representing either the coefficients $C_0$ through $C_{11}$, or the coefficients $C_0$ through $C_2$, $C_4$ through $C_6$, and $C_8$ through $C_{10}$.

Figure 6:
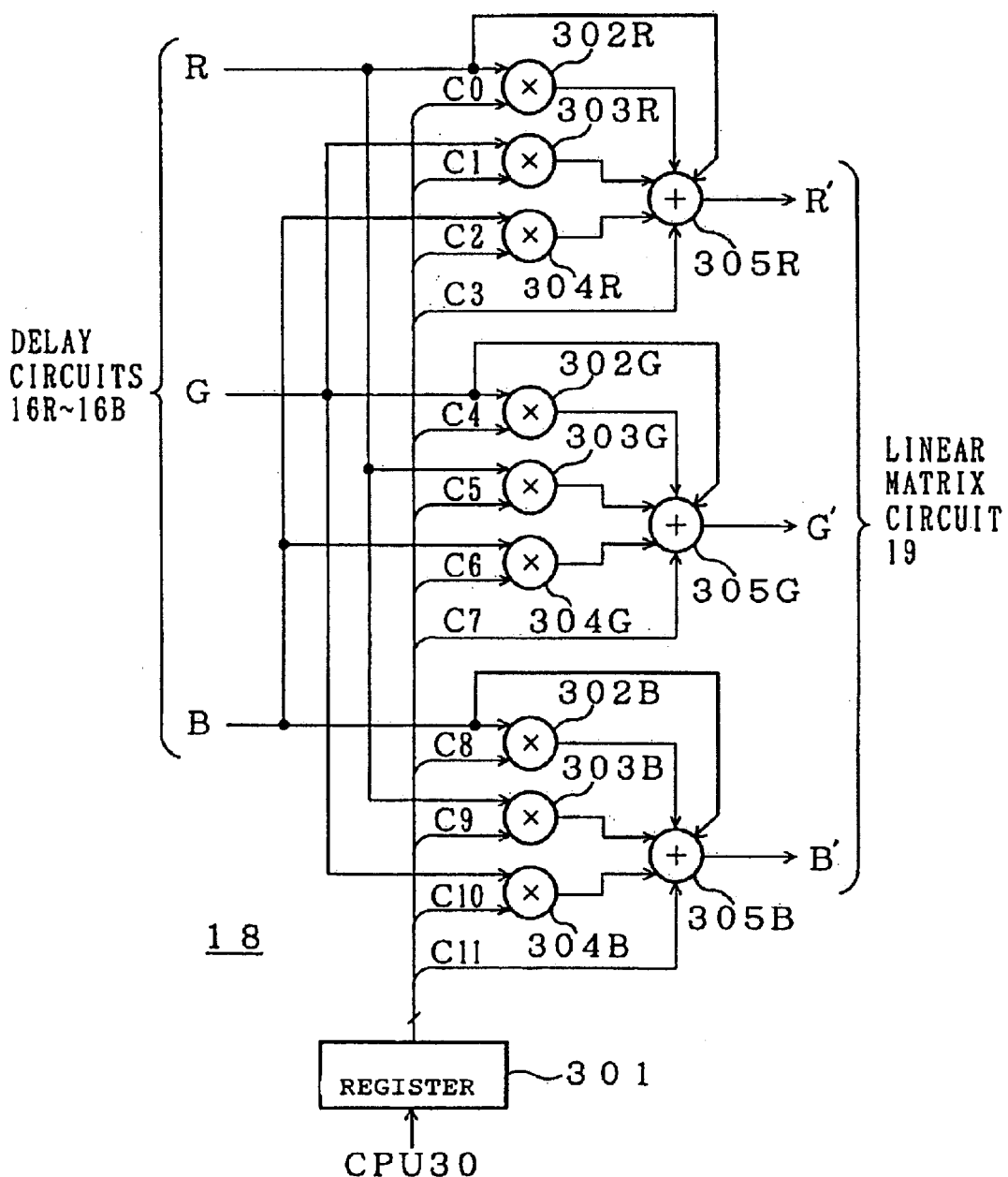
FIG. 6 is a circuit diagram of a second circuit constitution example of the color matching circuit.

FIG. 6 is a circuit diagram of the second circuit constitution example of the color matching circuit 18 to which the equations (17) are applied. In FIG. 6, a register 301 retains the color coefficients COE ($C_0$–$C_{11}$) supplied from the MSU 102 past the CPU 30 (see FIG. 2) over a communication line.

The red signal R, green signal G and blue signal B from the delay circuits 16R, 16G and 16B (see FIG. 2) are sent to multipliers 302R, 303R and 304R respectively. The multipliers 302R, 303R and 304R multiply the red signal R, green signal G and blue signal B respectively by the coefficients $C_0$, $C_1$ and $C_2$ from the register 301. The output signals of the multipliers 302R, 303R an 304R are fed to an adder 305R for addition. The added result in the adder is supplemented by the coefficient $C_3$ from the register 301, whereby the DC offset value $O_r$ is obtained. The adder 305R is further supplied with the red signal R from the delay circuit 16R. Adding the DC offset value $O_r$ to the red signal R generates an output red signal R'.

The green signal G, red signal R and blue signal B from the delay circuits 16G, 16R and 16B are sent to multipliers 302G, 303G and 304G respectively. The multipliers 302G, 303G and 304G multiply the green signal G, red signal R and blue signal B respectively by the coefficients $C_4$, $C_5$ and $C_6$ from the register 301. The output signals of the multipliers 302G, 303G an 304G are fed to an adder 305G for addition. The added result in the adder is supplemented by the coefficient $C_7$ from the register 301, whereby the DC offset value $O_g$ is acquired. The adder 305G is further supplied with the green signal G from the delay circuit 16G. Adding the DC offset value $O_g$ to the green signal G generates an output green signal G'.

The blue signal B, red signal R and green signal G from the delay circuits 16B, 16R and 16G are transferred to multipliers 302B, 303B and 304B respectively. The multipliers 302B, 303B and 304B multiply the blue signal B, red signal R and green signal G respectively by the coefficients $C_8$, $C_9$ and $C_{10}$ from the register 301. The output signals of the multipliers 302B, 303B an 304B are fed to an adder 305B for addition. The added result in the adder is supplemented by the coefficient $C_{11}$ from the register 301, where by the DC offset value $O_b$ is obtained. The adder 305B is further supplied with the blue signal B from the delay circuit 16B. Adding the DC offset value $O_b$ to the blue signal B produces an output blue signal B'.

As described, the color matching circuit 18 of FIG. 6 adjusts the DC offset values of the red, green and blue signals through the processing defined by the equations (17). The adjustments allow the system to absorb the color differences of the video cameras $101_{-2}$ through $101_{-N}$ relative to the reference video camera $101_{-1}$ in the color matching operation.

A variation of the above-described circuit constitution example is one to which the equations (21) are applied with the coefficients $C_3$, $C_7$ and $C_{11}$ omitted. This variation of the color matching circuit 18, not shown, is commensurate with the setup of FIG. 6 minus the components associated with the coefficients $C_3$, $C_7$ and $C_{11}$.

Consider a case where the processing defined by the equations (25) below is carried out by the color matching circuit 18. The equations (25) are made up of linear equations of r and g expressing the gains $G_r$, $G_g$ and $G_b$ as well as linear equations of R, G and B representing the DC offset values $O_r$, $O_g$ and $O_b$. These equations are expected to permit flexible color matching. As with the foregoing equations (12) and (13), where the method of least squares is adopted, the coefficients $C_0$ through $C_5$ are obtained by solving the simultaneous linear equations (26) below with six unknowns. When R is replaced by G and G by R in the equations (26), the equations become those to be solved to find the coefficients $C_6$ through $C_{11}$. When R is replaced by B, G by R and B by G in the equations (26), the equations become those to be solved to find the coefficients $C_{12}$ through $C_{17}$.

$$R'=(C_0r+C_1g+C_2)R+(C_3G+C_4B+C_5)$$

$$G'=(C_6r+C_7g+C_8)G+(C_9R+C_{10}B+C_{11})$$

$$B'=(C_{12}r+C_{13}g+C_{14})B+(C_{15}R+C_{16}G+C_{17}) \quad (25)$$

$$\begin{cases} \sum r^2R^2C_0 + \sum rgR^2C_1 + \sum rR^2C_2 + \sum rRGC_3 + \sum BRC_4 + \\ \qquad\qquad\qquad\qquad\qquad\qquad \sum rRC_5 = \sum rRR' \\ \sum rgR^2C_0 + \sum g^2R^2C_1 + \sum gR^2C_2 + \sum gRGC_3 + \sum gBRC_4 + \\ \qquad\qquad\qquad\qquad\qquad\qquad \sum gRC_5 = \sum gRR' \\ \sum rR^2C_0 + \sum gR^2C_1 + \sum R^2C_2 + \sum RGC_3 + \sum BRC_4 + \\ \qquad\qquad\qquad\qquad\qquad\qquad \sum RC_5 = \sum RR' \\ \sum rRGC_0 + \sum gRGC_1 + \sum RGC_2 + \sum G^2C_3 + \sum GBC_4 + \\ \qquad\qquad\qquad\qquad\qquad\qquad \sum GC_5 = \sum GR' \\ \sum rBRC_0 + \sum gBRC_1 + \sum BRC_2 + \sum GBC_3 + \sum B^2C_4 + \\ \qquad\qquad\qquad\qquad\qquad\qquad \sum BC_5 = \sum BR' \\ \sum rRC_0 + \sum gRC_1 + \sum RC_2 + \sum GC_3 + \sum B^2C_4 + \sum C_5 = \\ \qquad\qquad\qquad\qquad\qquad\qquad \sum R' \end{cases} \quad (26)$$

The coefficients $C_5$, $C_{11}$ and $C_{17}$ maybe omitted as long as the proper black balance is maintained. In such a case, the equations (25) above are reduced to the equations (27) shown below. Where the method of least squares is adopted, the coefficients $C_0$ through $C_4$ are obtained by solving the simultaneous linear equations (28) below with five unknowns. When R is replaced by G and G by R in the equations (28), the equations become those to be solved to find the coefficients $C_6$ through $C_{10}$. When R is replaced by B, G by R and B by G, the equations (28) become those to be solved to acquire the coefficients $C_{12}$ through $C_{16}$.

$$R'=(C_0r+C_1g+C_2)R+(C_3G+C_4B)$$

$$G'=(C_6r+C_7g+C_8)G+(C_9R+C_{10}B)$$

$$B'=(C_{12}r+C_{13}g+C_{14})B+(C_{15}R+C_{16}G) \quad (27)$$

$$\begin{cases} \sum r^2R^2C_0 + \sum rgR^2C_1 + \sum rR^2C_2 + \sum rRGC_3 + \sum BRC_4 = \quad (28) \\ \sum rRR' \\ \sum rgR^2C_0 + \sum g^2R^2C_1 + \sum gR^2C_2 + \sum gRGC_3 + \sum gBRC_4 = \\ \sum gRR' \\ \sum rR^2C_0 + \sum gR^2C_1 + \sum R^2C_2 + \sum RGC_3 + \sum BRC_4 + \\ \sum RC_5 = \sum RR' \\ \sum rRGC_0 + \sum gRGC_1 + \sum RGC_2 + \sum G^2C_3 + \sum GBC_4 = \\ \sum GR' \\ \sum rBRC_0 + \sum gBRC_1 + \sum BRC_2 + \sum GBC_3 + \sum B^2C_4 = \\ \sum BR' \end{cases}$$

It is the CPU in the MSU 102 (see FIG. 1) that solves either the three sets of simultaneous linear equations with six unknowns each, to find the coefficients $C_0$ through $C_{17}$, or the three sets of simultaneous linear equations with five unknowns each, to obtain the coefficients $C_0$ through $C_4$, $C_6$ through $C_{10}$ and $C_{12}$ through $C_{16}$. Either the coefficients $C_0$ through $C_{17}$, or the coefficients $C_0$ through $C_4$, $C_6$ through $C_{10}$ and $C_{12}$ through $C_{16}$, all computed by the MSU 102 for the video cameras $101_{-2}$ through $101_{-N}$, are supplied as the color matching coefficients COE to the color matching circuit 18 in each of these video cameras. The reference video camera $101_{-1}$ is fed with 1 representing the coefficients $C_2$, $C_8$ and $C_{14}$, and with 0 denoting the other coefficients.

Figure 7:
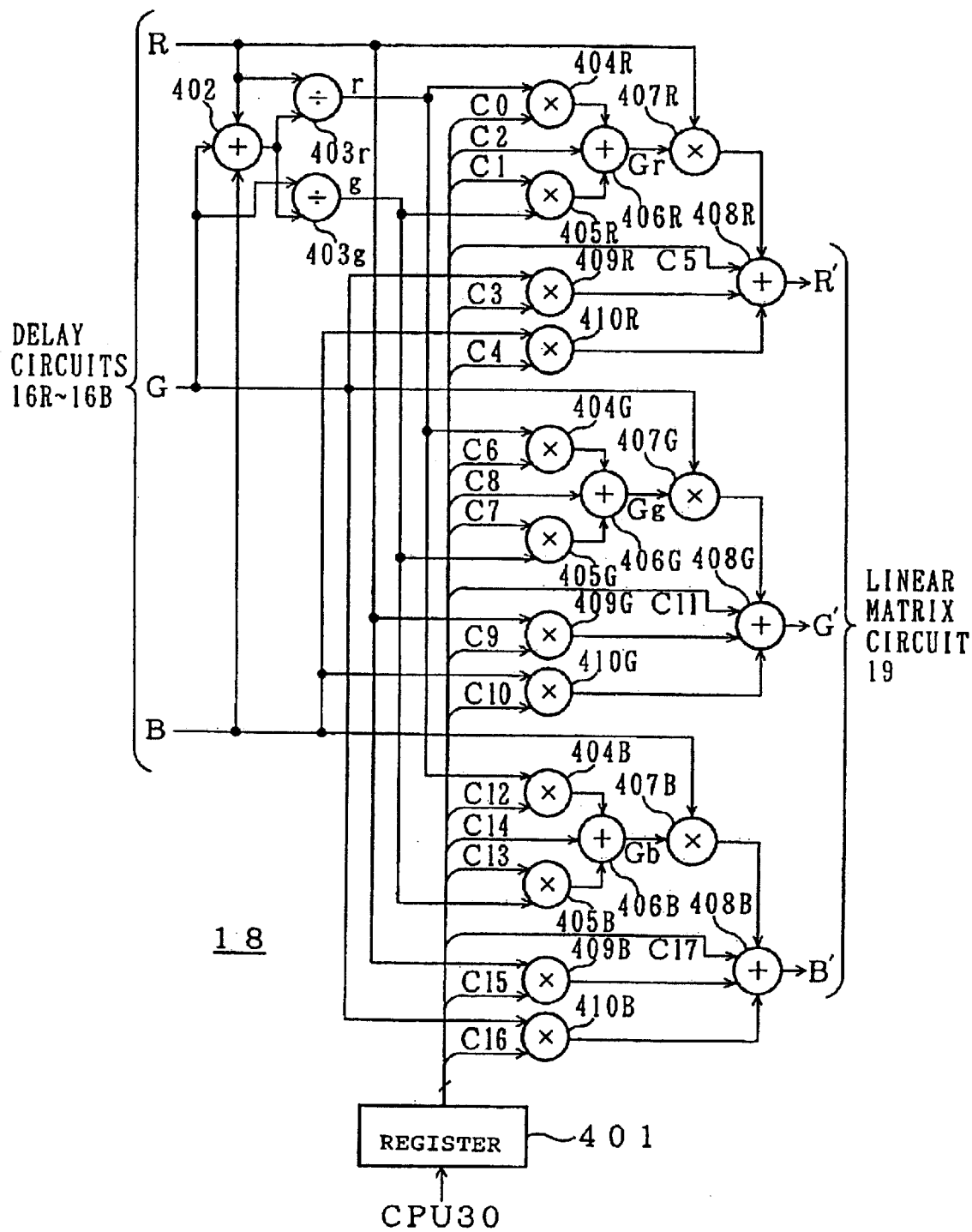
FIG. 7 is a circuit diagram of a third circuit constitution example of the color matching circuit.

FIG. 7 is a circuit diagram of the third circuit constitution example of the color matching circuit 18 to which the equations (25) are applied. In FIG. 7, a register 401 retains the color coefficients COE ($C_0$–$C_{17}$) supplied from the MSU 102 past the CPU 30 (see FIG. 2) over a communication line.

The red signal R, green signal G and blue signal B from the delay circuits 16R, 16G and 16B (see FIG. 2) are sent to an adder 402 for addition. The red signal R and the output signal of the adder 402 (R+G+B) are fed to a divider 403r whereby a signal r is obtained. The green signal G and the output signal of the adder 402 (R+G+B) are supplied to a divider 403g whereby a signal g is acquired.

The signal r from the divider 403r is transferred to multipliers 404R, 404G and 404B which multiply respectively the coefficients $C_0$, $C_6$ and $C_{12}$ from the register 401 by the received signal r. The signal g from the divider 403g is fed to multipliers 405R, 405G and 405B which multiply respectively the coefficients $C_1$, $C_7$ and $C_{13}$ from the register 401 by the received signal g.

The output signals of the multipliers 404R and 405R are sent to an adder 406R for addition. The added result in the adder is supplemented by the coefficient $C_2$ from the register 401, whereby the gain $G_r$ is obtained. The red signal R from the delay circuit 16R is added to a multiplier 407R which multiplies the received signal R by the gain $G_r$ from the adder 406R. The output signal of the multiplier 407R is supplied to an adder 408R.

The green signal G and blue signal B from the delay circuits 16G and 16B are sent respectively to multipliers 409R and 410R. The multipliers 409R and 410R multiply the received green and blue signals G and B respectively by the coefficients $C_3$ and $C_4$ from the register 401. The output signals of the multipliers 409R and 410R are forwarded to the adder 408R for addition. The added result in the adder is supplemented by the coefficient $C_5$ from the register 401, whereby the DC offset value $O_r$ is acquired. The adder 408R further adds the DC offset value $O_r$ to the signal from the multiplier 407R (R×Gr), thus generating an output red signal R'.

The output signals of the multipliers 404G and 405G are supplied to an adder 406G for addition. The added result in the adder is supplemented by the coefficient $C_8$ from the register 401, whereby the gain $G_g$ is obtained. The green signal R from the delay circuit 16G is added to a multiplier 407G which multiplies the received signal G by the gain Gg from the adder 406G. The output signal of the multiplier 407G is sent to an adder 408G.

The red signal R and blue signal B from the delay circuits 16R and 16B are fed respectively to multipliers 409G and 410G. The multipliers. 409G and 410G multiply the received red and blue signals R and B respectively by the coefficients $C_9$ and $C_{10}$ from the register 401. The output signals of the multipliers 409G and 410G are transferred to the adder 408G for addition. The added result in the adder is supplemented by the coefficient $C_{11}$ from the register 401, whereby the DC offset value $O_g$ is obtained. The adder 408G further adds the DC offset value $O_g$ to the signal from the multiplier 407G (G×Gg), thus generating an output green signal G'.

The output signals of the multipliers 404B and 405B are sent to an adder 406B for addition. The added result in the adder is supplemented by the coefficient $C_{14}$ from the register 401, whereby the gain Gb is obtained. The blue signal B from the delay circuit 16B is added to a multiplier 407B which multiplies the received signal B by the gain Gb from the adder 406B. The output signal of the multiplier 407B is sent to an adder 408B.

The red signal R and green signal B from the delay circuits 16R and 16G are supplied respectively to multipliers 409B and 410B. The multipliers 409B and 410B multiply the received red and green signals R and G respectively by the coefficients $C_{15}$ and $C_{16}$ from the register 401. The output signals of the multipliers 409B and 410B are sent to the adder 408B for addition. The added result in the adder is supplemented by the coefficient $C_{17}$ from the register 401, whereby the DC offset value $O_b$ is obtained. The adder 408B further adds the DC offset value $O_b$ to the signal from the multiplier 407B (B×Gr), thus generating an output blue signal B'.

As described, the color matching circuit 18 of FIG. 7 adjusts the gains and DC offset values of the red, green and blue signals through the processing defined by the equations (25) above. The adjustments allow the system to absorb the color differences of the video cameras 101$_{-2}$ through 101$_{-N}$ relative to the reference video camera 101$_{-1}$ in the color matching operation.

The linear matrix circuit 19 performs the processing defined by the equation (29) below involving six coefficients a through f. The processing, which has not been discussed so far, is intended to compensate any negative portions in the ideal spectral imaging characteristics of the NTSC format by reducing the remaining portions of the tristimulus values. That is, a colorless object being imaged leaves the tristimulus values unchanged. The equation (29) represents a functional relation wherein the gains $G_r$, $G_g$ and $G_b$ are represented by 1 and the DC offset values $O_r$, $O_g$ and $O_b$ are expressed by linear equations of color differences. In the equation (29), $R_i$, $G_i$ and $B_i$ stand for the tristimulus values of the input, and $R_0$, $G_0$ and $B_0$ denote the tristimulus values of the output.

$$\begin{bmatrix} R_0 \\ G_0 \\ B_0 \end{bmatrix} = \begin{bmatrix} 1+a+b & -a & -b \\ -c & 1+c+d & -d \\ -e & -f & 1+e+f \end{bmatrix} \begin{bmatrix} R_i \\ G_i \\ B_i \end{bmatrix} \quad (29)$$

Consider next a case where the color matching circuit 18 performs the processing defined by the equations (30) below, i.e., the processing equal to that carried out by the linear matrix circuit 19. Specifically, the equations (30) have the gains $G_r$, $G_g$ and $G_b$ represented by 1 and have the DC offset values $O_r$, $O_g$ and $O_b$ expressed by linear equations of color differences. The equations (30) are formulated by setting the relations (31) below in the equations (17) shown earlier. With the equations (30) in effect, a colorless object being imaged leaves the tristimulus values unchanged.

$R'=R+C_0(R-G)+C_1(R-B)$ $G'=G+C_2(G-R)+C_3(G-B)$ $B'=B+C_4(B-R)+C_5(B-G)$ \quad (30)

$C_0+C_1+C_2=0, C_3=0$ $C_4+C_5+C_6=0, C_7=0$ $C_8+C_9+C_{10}=0, C_{11}=0$ \quad (31)

Where the method of least squares is applied, the coefficients $C_0$ and $C_1$ are obtained by solving the simultaneous equations (32) below. When R is replaced by G and G by R in the equations (32), the equations become those to be solved to find the coefficients $C_2$ and $C_3$. When R is replaced by B, G by R and B by G in the equations (32), the equations become those to be solved to obtain the coefficients $C_4$ and $C_5$.

$$\begin{cases} \sum (R-G)^2 C_0 + \sum (R-G)(R-B)C_1 = \sum (R-G)(R'-R) \\ \sum (R-G)(R-B)C_0 + \sum (R-B)^2 C_1 = \sum (R-G)(R'-R) \end{cases} \quad (32)$$

Suppose that the six coefficients $C_0$ through $C_5$ in the equations (30) are varied with the tristimulus values R, G and B. In that case, only two parameters are needed because it is color difference gains that are to be changed. In this respect, the embodiment of the invention envisages using the equation (33) below involving two parameters (r, g).

$R'=R+(C_0r+C_1g+C_2)(R-G)+(C_3r+C_4g+C_5)(R-B)$ $G'=G+(C_6r+C_7g+C_8)(G-R)+(C_9r+C_{10}g+C_{11})(G-B)$ $B'=B+(C_{12}r+C_{13}g+C_{14})(B-R)+(C_{15}r+C_{16}g+C_{17})(B-G)$ \quad (33)

Where the method of least squares is applied on the basis of the equations (33) above, the coefficients $C_0$ through $C_5$ are acquired by solving the simultaneous equations (34) below. When R is replaced by G and G by R in the equations (34), the equations become those to be solved to find the coefficients $C_6$ through $C_{11}$. When R is replaced by B, G by R and B by G in the equations (34), the equations become those to be solved to obtain the coefficients $C_{12}$ through $C_{17}$.

$\Sigma r^2(R-G)^2 C_0 + \Sigma rg(R-G)^2 C_1 + \Sigma r(R-G)^2 C_2 + \Sigma r^2(R-G)(R-B)C_3 + \Sigma rg(R-G)(R-B)C_4 + \Sigma r(R-G)(R-B)C_5 = \Sigma r(R-G)(R'-R)$ $\Sigma rg(R-G)^2 C_0 + \Sigma g^2(R-G)^2 C_1 + \Sigma g(R-G)^2 C_2 + \Sigma rg(R-G)(R-B)C_3 + \Sigma g^2(R-G)(R-B)C_4 + \Sigma g(R-G)(R-B)C_5 = \Sigma g(R-G)(R'-R)$ $\Sigma r(R-G)^2 C_0 + \Sigma g(R-G)^2 C_1 + \Sigma (R-G)^2 C_2 + \Sigma r(R-G)(R-B)C_3 + \Sigma g(R-$ $G)(R-B)C_4+\Sigma(R-G)(R-B)C_5=\Sigma(R-G)(R'-R)$ $\Sigma r^2(R-G)(R-B)C_0+\Sigma rg(R-G)(R-B)C_1+\Sigma r(R-G)(R-B)C_2+\Sigma r^2(R-B)^2C_3+\Sigma rg(R-B)^2C_4+\Sigma r(R-B)^2C_5=\Sigma r(R-B)(R'-R)$ $\Sigma rg(R-G)(R-B)C_0+\Sigma g^2(R-G)(R-B)C_1+\Sigma g(R-G)(R-B)C_2+\Sigma rg(R-B)C_3+\Sigma g^2(R-B)^2C_4+\Sigma g(R-B)^2C_5=\Sigma g(R-B)(R'-R)$ $\Sigma r(R-G)(R-B)C_0+\Sigma g(R-G)(R-B)C_1+\Sigma(R-G)(R-B)C_2+\Sigma r(R-B)^2C_3+\Sigma g(R-B)^2C_4+\Sigma(R-B)^2C_5=\Sigma(R-B)(R'-R)$ (34)

Although the equations (33) above need 18 coefficients $C_0$ through $C_{17}$ as described, the number of coefficients may be reduced to 15. In order to explain why the number of coefficients may be reduced, reference is made to equations (35) and (36) in which $D_0, D_1 \ldots D_5$ denote an alternative set of coefficients. It will be appreciated that the equation (35) below holds even if $C_0 \neq D_0$ as long as the equations (36) below hold. Thus if $D_0=0$, then one coefficient can be omitted. In like manner, one of the coefficients $C_0$ through $C_5$, another out of $C_6$ through $C_{11}$ and yet another out of $C_{12}$ through $C_{17}$ can be omitted, which leaves 15 coefficients. This reduces the equations (33) above to the equations (37) below.

$(C_0r+C_1g+C_2)(R-G)+(C_3r+C_4g+C_5)(R-B)=(D_0r+D_1g+D_2)(R-G)+(D_3r+D_4g+D_5)(R-B)$ (35)

$$D_1 = C_1 + \frac{D_0 - C_0}{2}, D_2 = C_1 - \frac{D_0 - C_0}{2}$$
$$D_3 = C_3 - \frac{D_0 - C_0}{2}, D_4 = C_4 + \frac{D_0 - C_0}{2}, D_5 = C_5$$ (36)

$R'=R+(C'_0r+C'_1g+C'_2)(R-G)+(C'_3r+C'_4g)(R-B)$ $G'=G+(C'_5r+C'_6g+C'_7)(G-R)+(C'_8r+C'_9)(G-B)$ $B'=B+(C'_{10}r+C'_{11}g+C'_{12})(B-R)+(C'_{13}r+C'_{14})(B-G)$ $C'_0=C_0-2C_4, C'_1=C_1-C_4, C'_2=C_2+C_4, C'_3=C_3+C_4, C'_4=C_5$ $C'_5=C_6+C_{10}, C'_6=C_7+2C_{10}, C'_7=C_8-C_{10}, C'_8=C_9+C_{10}, C'_9=C_{11}$ $C'_{10}=C_{12}+C_{16}, C'_{11}=C_{13}+2C_{16}, C'_{12}=C_{14}-C_{16}, C'_{13}=C_{15}-2C_{16}, C'_{14}=C_{17}+C_{16}$ (37)

Where the method of least squares is applied on the basis of the equations (37) above, the coefficients $C_0'$ through $C_4'$ are obtained by solving the simultaneous equations (38) shown below. When R is replaced by G and G by R in the equations (38), the equations become those to be solved to find the coefficients $C_5'$ through $C_9'$. When R is replaced by B, G by R and B by G in the equations (38), the equations become those to be solved to acquire the coefficients $C_{10}'$ through $C_{14}'$. ti $\Sigma r^2(R-G)^2C'_0+\Sigma rg(R-G)^2C'_1+\Sigma r(R-G)^2C'_2+\Sigma r^2(R-G)(R-B)C'_3+\Sigma r(R-G)(R-B)C'_4=\Sigma r(R-G)(R'-R)$ $\Sigma rg(R-G)^2C'_0+\Sigma g^2(R-G)^2C'_1+\Sigma g(R-G)^2C'_2+\Sigma rg(R-G)(R-B)C'_3+\Sigma g(R-G)(R-B)C'_4=\Sigma g(R-G)(R'-R)$ $\Sigma r(R-G)^2C'_0+\Sigma g(R-G)^2C'_1+\Sigma(R-G)^2C'_2+\Sigma r(R-G)(R-B)C'_3+\Sigma(R-G)(R-B)C'_4=\Sigma(R-G)(R'-R)$ $\Sigma r^2(R-G)(R-B)C'_0+\Sigma rg(R-G)(R-B)C'_1+\Sigma r(R-G)(R-B)C'_2+\Sigma r^2(R-B)^2C'_3+\Sigma_r(R-B)^2C'_4=\Sigma r(R-B)(R'-R)$ $\Sigma r(R-G)(R-B)C'_0+\Sigma g(R-G)(R-B)C'_1+\Sigma(R-G)(R-B)C'_2+\Sigma r(R-B)^2C'_3+\Sigma(R-B)^2C'_4=\Sigma(R-B)(R'-R)$ (38)

Figure 8:
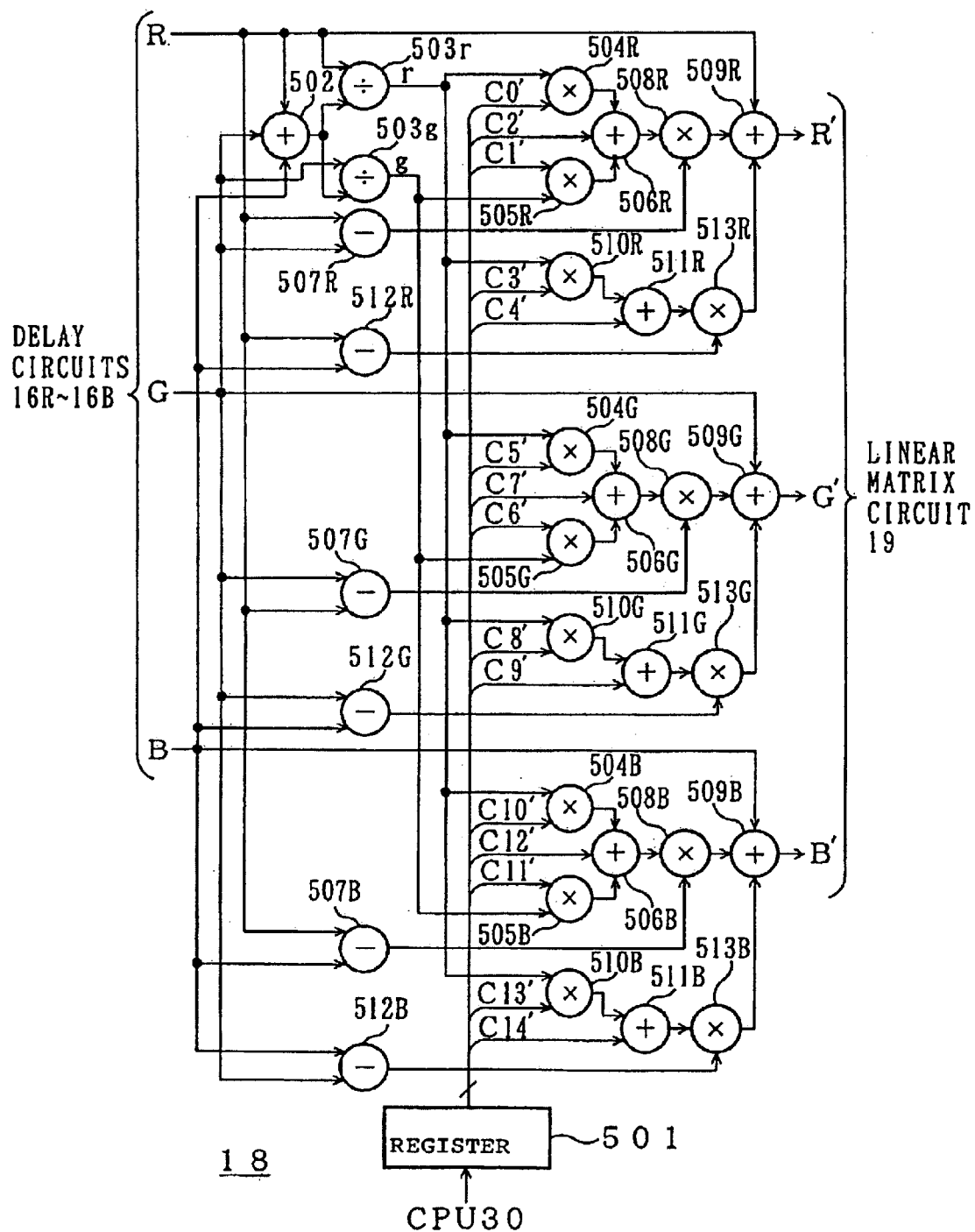
FIG. 8 is a circuit diagram of a fourth circuit constitution example of the color matching circuit.
Figure 9:
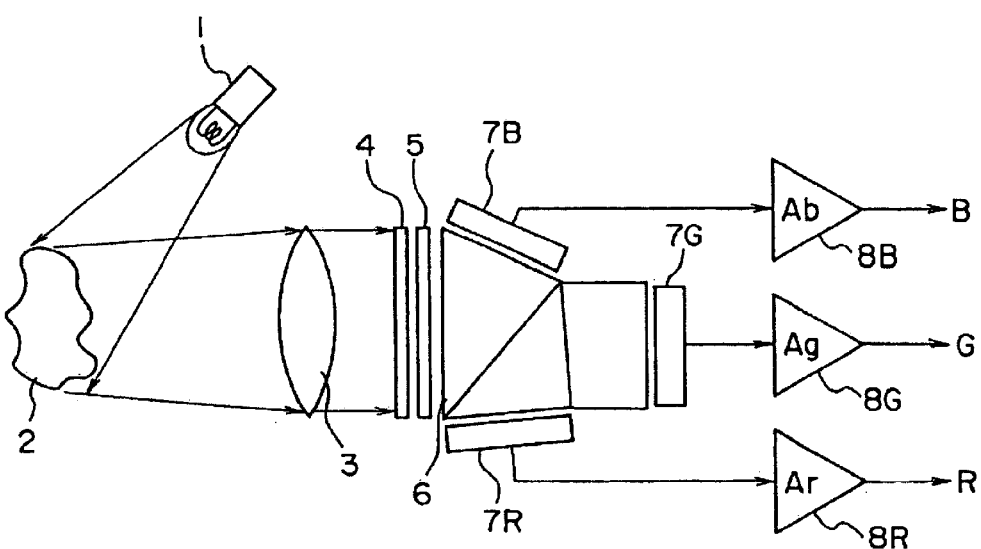
FIG. 9 is a schematic view outlining the constitution of the video camera.
Figures 10A, 10B:
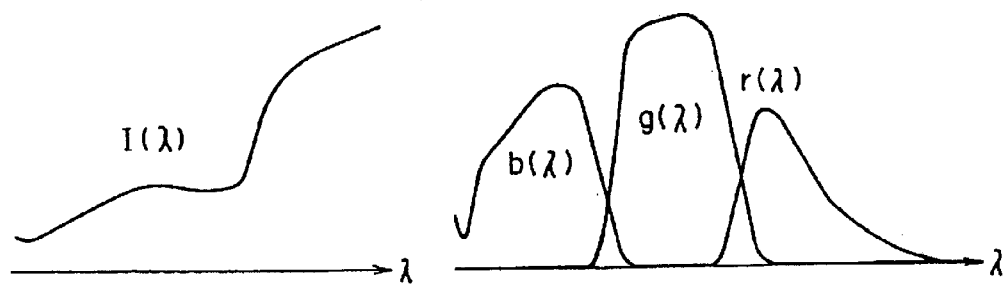
FIGS. 10A and 10B are graphic representations illustrating the spectral distribution characteristics of the camera input and of the camera.

FIG. 8 is a circuit diagram of the fourth circuit constitution example of the color matching circuit 18 to which the equations (37) above are applied. In FIG. 8, a register 501 retains the color coefficients COE ($C_0'-C_{14}'$) supplied from the MSU 102 past the CPU 30 (see FIG. 2) over a communication line.

The red signal R, green signal G and blue signal B from the delay circuits 16R, 16G and 16B (see FIG. 2) are sent to an adder 502 for addition. The red signal R and the output signal of the adder 502 (R+G+B) are fed to adivider 503r whereby a signal r is obtained. The green signal G and the output signal of the adder 502 (R+G+B) are supplied to a divider 503g whereby a signal g is acquired.

The signal r from the divider 503r is transferred to a multiplier 504R which multiplies the received signal by the coefficient $C_0'$ from the register 501. The signal g from the divider 503g is forwarded to a multiplier 505R which multiplies the received signal by the coefficient $C_1'$ from the register 501. The output signals of the multipliers 504R and 505R are fed to an adder 506R for addition. The added result in the adder is supplemented by the coefficient $C_2'$ from the register 501.

The red signal R and green signal G from the delay circuits 16R and 16G are supplied to a subtracter 507R for subtraction. The output signal of the subtracter 507R (R−G) and the output signal of the adder 506R ($C_0'r+C_1'g+C_2'$) are sent to a multiplier 508R for multiplication. The output signal of the multiplier 508R is sent to an adder 509R.

The signal r from the divider 503r is supplied to a multiplier 510R which multiplies the received signal by the coefficient $C_3'$ from the register 501. An adder 511R adds up the output signal of the multiplier 510R and the coefficient $C_4'$ from the register 501. The red signal R and blue signal B from the delay circuits 16R and 16B are fed to a subtracter 512R for subtraction. The output signal of the subtracter 512R (R−B) and the output signal of the adder 511R ($C_3'r+C_4'$) are sent to a multiplier 513R for multiplication. The output signal of the multiplier 513R is transferred to the adder 509R.

The adder 509R adds up the output signals of the multipliers 508R and 513R, thus generating the DC offset value $O_r$. The adder 509R further adds the DC offset value $O_r$ to the red signal R from the delay circuit 16R to produce an output red signal R'.

The signal r from the divider 503r is fed to a multiplier 504G which multiplies the received signal by the coefficient $C_5'$ from the register 501. The signal g from the divider 503g is supplied to a multiplier 505G which multiplies the received signal by the coefficient $C_6'$ from the register 501. The output signals of the multipliers 504G and 505G are sent to an adder 506G for addition. The added result in the adder is supplemented by the coefficient $C_7'$ from the register 501.

The green signal G and red signal R from the delay circuits 16G and 16R are transferred to a subtracter 507G for subtraction. The output signal of the subtracter 507G (G−R) and the output signal of the adder 506G ($C_5'r+C_6'g+C_7'$) are supplied to a multiplier 508G for multiplication. The output signal of the multiplier 508G is forwarded to an adder 509G.

The signal r from the divider 503r is sent to a multiplier 510G which multiplies the received signal by the coefficient $C_8'$ from the register 501. An adder 511G adds up the output signal of the multiplier 510G and the coefficient $C_9'$ from the register 501. The green signal G and blue signal B from the delay circuits 16G and 16B are transferred to a subtracter 512G for subtraction. The output signal of the subtracter 512G (G−B) and the output signal of the adder 511G ($C_8'r+C_9'$) are forwarded to a multiplier 513G for multiplication. The output signal of the multiplier 513G is fed to the adder 509G.

The adder 509G adds up the output signals of the multipliers 508G and 513G to produce the DC offset value $O_g$. Furthermore, the adder 509G adds the DC offset value $O_g$ to the green signal G from the delay circuit 16G to generate an output green signal G'.

The signal r from the divider 503r is also sent to a multiplier 504B which multiplies the received signal by the coefficient $C_{10}'$ from the register 501. The signal g from the divider 503g is supplied to a multiplier 505B which multiplies the received signal by the coefficient $C_{11}'$ from the register 501. The output signals of the multipliers 504B and 505B are fed to an adder 506B for addition. The added result in the adder is supplemented by the coefficient $C_{12}'$ from the register 501.

The blue signal B and red signal R from the delay circuits 16B and 16R are transferred to a subtracter 507B for subtraction. The output signal of the subtracter 507B (B−R) and the output signal of the adder 506B ($C_{10}'r+C_{11}'g+C_{12}'$) are forwarded to a multiplier 508B for multiplication. The output o the multiplier 508B is fed to an adder 509B.

The signal r from the divider 503r is also supplied to a multiplier 510B which multiplies the received signal by the coefficient $C_{13}'$ from the register 501. An adder 511B adds up the output signal of the multiplier 510B and the coefficient $C_{14}'$ from the register 501. The blue signal B and green signal G from the delay circuits 16B and 16G are sent to a subtracter 512B for subtraction. The output signal of the subtracter 512B (B−G) and the output signal of the adder 511B ($C_{13}'r+C_{14}'$) are fed to a multiplier 513B for multiplication. The output signal of the multiplier 513B is supplied to the adder 509B.

The adder 509B adds up the output signals of the multipliers 508B and 513B to generate the DC offset value $O_b$. Furthermore, the adder 509B adds the DC offset value $O_b$ to the blue signal B from the delay circuit 16B to produce an output blue signal B'.

As described, the color matching circuit 18 of FIG. 8 adjusts the DC offset values of the red, green and blue signals through the processing defined by the equations (37) above. The adjustments allow the system to absorb the color differences of the video cameras $101_{-2}$ through $101_{-N}$ relative to the reference video camera $101_{-1}$ in the color matching operation.

The embodiment of the invention thus uses the color matching circuit 18 to adjust the gains and DC offset values of the red, green and blue signals obtained from imaging operation in accordance with the levels of these signals. The color matching operation permits effective absorption of color differences between the different video cameras $101_{-1}$ through $101_{-N}$ constituting the video camera system.

Although the embodiment above computes errors with no weight placed on the measurements of the respective colors, this is not limitative of the invention. Alternatively, the measured value of each color may be weighted in the following manner. Suppose that $R_i'$, $G_i'$ and $B_i'$ represent the tristimulus values of the reference video camera in effect when the camera images an i-th color, that $R_i$, $G_i$ and $B_i$ denote the tristimulus values of the video cameras to be matched in color relative to the reference video camera, and that $W_i$ stands for the weight of the error regarding the i-th color. In that case, the total sum of errors squared is given by the equation (39) below.

$$\sum_i E_i^2 = \sum_i W_i(R_i' - R_i)^2 + \sum_i W_i(G_i' - G_i)^2 + \sum_i W_i(B_i' - B_i)^2 \quad (39)$$

If the above error equation is applied to the equations (38), the coefficients $C_0'$ through $C_4'$ for minimizing the error are obtained by solving the simultaneous equations (40) shown below. When R is replaced by G and G by R in the simultaneous equations (40), the equations become those to be solved to find the coefficients $C_5'$ through $C_9'$. When R is replaced by B, G by R and B by G in the simultaneous equations (40), the equations become those to be solved to obtain the coefficients $C_{10}'$ through $C_{14}'$. That is, the terms in the simultaneous equations are each multiplied by the weight $W_i$ before being added up. The same applies to the equations (14) through (16), (18) through (20), (26), (28), (32) and (34).

$$\sum_i W_i r_i^2 (R_i - G_i)^2 C_0' + \quad (40)$$

$$\sum_i W_i r_i g_i (R_i - G_i)^2 C_1' + \sum_i W_i r_i (R_i - G_i)^2 C_2' +$$

$$\sum_i W_i r_i^2 (R_i - G_i)(R_i - B_i) C_3' + \sum_i W_i r_i (R_i - G_i)(R_i - B_i) C_4' =$$

$$\sum_i W_i r_i (R_i - G_i)(R_i - R_i) \sum_i W_i r_i g_i (R_i - G_i)^2 C_0' +$$

$$\sum_i W_i g_i^2 (R_i - G_i)^2 C_1' + \sum_i W_i g_i (R_i - G_i)^2 G_2' +$$

$$\sum_i W_i r_i g_i (R_i - G_i)(R_i - B_i) C_3' + \sum_i W_i g_i (R_i - G_i)(R_i - B_i) C_4' =$$

$$\sum_i W_i g_i (R_i - G_i)(R_i - R_i) \sum_i W_i r_i (R_i - G_i)^2 C_0' +$$

$$\sum_i W_i g_i (R_i - G_i)^2 C_1' + \sum_i W_i (R_i - G_i)^2 C_2' +$$

$$\sum_i W_i r_i (R_i - G_i)(R_i - B_i) C_3' + \sum_i W_i (R_i - G_i)(R_i - B_i) C_4' =$$

$$\sum_i W_i (R_i - G_i)(R_i - R_i) \sum_i W_i r_i^2 (R_i - G_i)(R_i - B_i) C_0' +$$

$$\sum_i W_i r_i g_i (R_i - G_i)(R_i - B_i) C_1' =$$

$$\sum_i W_i r_i (R_i - G_i)(R_i - B_i) C_2' + \sum_i W_i r_i^2 (R_i - B_i)^2 C_3' +$$

$$\sum_i W_i r_i (R_i - B_i)^2 C_4' =$$

$$\sum_i W_i r_i (R_i - B_i)(R_i - R_i) \sum_i W_i r_i (R_i - G_i)(R_i - B_i) C_0' +$$

$$\sum_i W_i g_i (R_i - G_i)(R_i - B_i) C_1' +$$

$$\sum_i W_i g_i (R_i - G_i)(R_i - B_i) C_2' + \sum_i W_i r_i (R_i - B_i)^2 C_3' +$$

$$\sum_i W_i (R_i - B_i)^2 C_4' = \sum_i W_i (R_i - B_i)(R_i - R_i)$$

In the above-described embodiment, the linear matrix circuit 19 is connected downstream of the color matching circuit 18 for absorbing color differences between different video cameras configured, the linear matrix circuit 19 compensating any losses of saturation in the imaging segment of the system. Whereas the coefficients of the color matching circuit 18 are different with respect to different video cameras as discussed, the coefficients of the linear matrix circuit 19 are the same for all the video cameras configured within the same studio.

Suppose now that the color matching circuit 18 performs the processing defined by the equations (41) below using the coefficients $C_0$ through $C_5$ (the same as in the equations (30) above), and that the linear matrix circuit 19 carries out the processing defined by the equations (42) below involving the coefficients $C_0'$ through $C_5'$ (see the equations (29) above)

$$\begin{bmatrix} R' \\ G' \\ B' \end{bmatrix} = \begin{bmatrix} 1+C_0+C_1 & -C_0 & -C_1 \\ -C_2 & 1+C_2+C_3 & -C_3 \\ -C_4 & -C_5 & 1+C_4+C_5 \end{bmatrix} \cdot \begin{bmatrix} R \\ G \\ B \end{bmatrix} \quad (41)$$

$$\begin{bmatrix} R'' \\ G'' \\ B'' \end{bmatrix} = \begin{bmatrix} 1+C_0'+C_1' & -C_0' & -C_1' \\ -C_2' & 1+C_2'+C_3' & -C_3' \\ -C_4' & -C_5' & 1+C_4'+C_5' \end{bmatrix} \cdot \begin{bmatrix} R' \\ G' \\ B' \end{bmatrix} \quad (42)$$

In that case, a series circuit made up of the color matching circuit 18 and linear matrix circuit 19 performs the processing defined by the matricial equation for multiplication (43) below. As shown in the equations (44) below, the equation (43) can be developed into matricial equations similar to the equations (41) and (42). This means that either the color matching circuit 18 or the linear matrix circuit 19 may be used to perform the kind of processing equivalent to what is carried out by the series circuit composed of the color matching circuit 18 and linear matrix circuit 19. In this case, it is necessary to set to the above circuit the coefficients $C_0''$ through $C_5''$ derived from the coefficients $C_0$ through $C_5$ and $C_0'$ through $C_5'$.

$$\begin{bmatrix} R'' \\ G'' \\ B'' \end{bmatrix} = \begin{bmatrix} 1+C_0''+C_1'' & -C_0'' & -C_1'' \\ -C_2'' & 1+C_2''+C_3'' & -C_3'' \\ -C_4'' & -C_5'' & 1+C_4''+C_5'' \end{bmatrix} \cdot$$

$$\begin{bmatrix} 1+C_0+C_1 & -C_0 & -C_1 \\ -C_2 & 1+C_2+C_3 & -C_3 \\ -C_4 & -C_5 & 1+C_4+C_5 \end{bmatrix} \begin{bmatrix} R \\ G \\ B \end{bmatrix}$$

$$\begin{bmatrix} R'' \\ G'' \\ B'' \end{bmatrix} = \begin{bmatrix} 1+C_0''+C_1'' & -C_0'' & -C_1'' \\ -C_2'' & 1+C_2''+C_3'' & -C_3'' \\ -C_4'' & -C_5'' & 1+C_4''+C_5'' \end{bmatrix} \cdot \begin{bmatrix} R \\ G \\ B \end{bmatrix}$$

(43)

$C''_0 = (1+C_0'+C_1')C_0 + (1+C_2'+C_3')C_0' - C_1'C_5$ $C''_1 = (1+C_0'+C_1')C_1 + (1+C_4'+C_5')C_1' - C_0'C_3$ $C''_2 = (1+C_2'+C_3')C_2 + (1+C_0+C_1)C_2' - C_3'C_4$ $C''_3 = (1+C_2'+C_3')C_3 + (1+C_4'+C_5')C_3' - C_2'C_1$ $C''_4 = (1+C_4'+C_5')C_4 + (1+C_0+C_1)C_4' - C_5'C_2$ $C''_5 = (1+C_4'+C_5')C_5 + (1+C_2'+C_3')C_5' - C_4'C_0$

If the six coefficients $C_0$ through $C_5$ in the equation (41) above are represented by two parameters (r, g), then the result is the equations (45) below (see the equations (37) above). The processing carried out in that case is followed by that which is defined by the equation (42). This means that the series circuit made up of the color matching circuit 18 and linear matrix circuit 19 performs the processing defined by the equations (46) below. In carrying out the processing, the circuit shown in FIG. 8 can act both as the color matching circuit 18 and as the linear matrix circuit 19. It should be noted that the coefficients $C_0'$ through $C_{14}'$ are replaced by the coefficients $C_0''$ through $C_{14}''$ in the equations (46).

$R' = R + (C_0 r + C_1 g + C_2)(R-G) + (C_3 r + C_4)(R-B)$ $G' = G + (C_5 r + C_6 g + C_7)(G-R) + (C_8 r + C_9)(G-B)$ $B' = B + (C_{10} r + C_{11} g + C_{12})(B-R) + (C_{13} r + C_{14})(B-G)$ \quad (45)

$R'' = R + (C''_0 r + C''_1 g + C''_2)(R-G) + (C''_3 r + C''_4)(R-B)$ $G'' = G + (C''_5 r + C''_6 g + C''_7)(G-R) + (C''_8 r + C''_9)(G-B)$ $B'' = B + (C''_{10} r + C''_{11} g + C''_{12})(R-B) + (C''_{13} r + C''_{14})(R-B)$ $C''_0 = (1+C_0'+C_1')C_0 + C_0'(C_5+C_8) + C_1'(-2C_{11}-C_{13})$ $C''_1 = (1+C_0'+C_1')C_1 + C_0'C_6 - C_1'C_{11}$ $C''_2 = (1+C_1'+C_1')C_2 + C_0'(1C_7+C_9) + C_1'(C_{11}-C_{14})$ $C''_3 = (1+C_0'+C_1')C_3 - C_0'C_8 + C_1'(C_{10}+C_{11}+C_{13})$ $C''_4 = (1+C_0'+C_1')C_4 - C_0'C_9 + C_1'(1+C_{12}+C_{14})$ $C''_5 = (1+C_2'+C_3')C_5 + C_2'(C_0+C_2) + C_3'(-C_{10}+C_{11})$ $C''_6 = (1+C_2'+C_3')C_6 + C_2'C_1 - C_3'C_{11}$ $C''_7 = (1+C_2'+C_3')C_7 + C_2'(1+C_2+C_4) + C_3'(-C_{11}-C_{12})$ $C''_8 = (1+C_2'+C_3')C_8 - C_2'C_3 + C_3'(C_{10}+C_{11}+C_{13})$ $C''_9 = (1+C_2'+C_3')C_9 - C_2'C_4 + C_3'(1+C_{12}+C_{14})$ $C''_{10} = (1+C_4'+C_5')C_{10} + C_4'(C_0-C_1+C_3) + C_5'(-C_5+C_6)$ $C''_{11} = (1+C_4'+C_5')C_{11} - C_4'C_1 + C_5'C_6$ $C''_{12} = (1+C_4'+C_5')C_{12} + C_4'(1+C_1+C_2+C_4) + C_5'(-C_6+C_7)$ $C''_{13} (1+C_4'+C_5')C_{13} + C_4'(C_0+2C_1) + C_5'(-C_5+2C_6+C_8)$ $C''_{14} = (1+C_4'+C_5')C_{14} + C_4'(-C_1-C_2) + C_5'(1+C_6+C_7+C_9)$ \quad (46)

The color matching circuit 18 in the above embodiment has been shown providing color matching by carrying out its processing using the gains $G_r$, $G_g$ and $G_b$ and the DC offset values $O_r$, $O_g$ and $O_b$ determined by the tristimulus values $R_2$, $G_2$ and $B_2$ indicated in the equations (4). This setup has the following disadvantage. That is, where an appropriate functional relation is obtained on the basis of the equations (5) and (6) under a certain lighting condition for a given object to be matched in color among the configured video cameras, that relation does not hold and must be changed once a different lighting condition is introduced. One solution to this problem is to correct the gains $G_r$, $G_g$ and $G_b$ as well as the DC offset values $O_r$, $O_g$ and $O_b$ through the following approximation:

Assuming that the functional relation of the equations (5) and (6) has been acquired and retained in accordance with the tristimulus values $R_2$, $G_2$ and $B_2$ obtained through imaging operation with the amplifier gains $A_{r2}$, $A_{g2}$ and $A_{b2}$ in effect (i.e., composite gains from the preamplifiers 12R, 12G and 12B and the video amplifiers 13R, 13G and 13B); When the lighting condition is subsequently changed and the white balance is reestablished, the amplifier gains are modified accordingly. This means that, even with the spectral distribution $I(\lambda)$ of the camera input kept unchanged, the resulting tristimulus values are different from those given when the above functional relation was in effect. Thus the equations (5) and (6) do not hold as they are.

As evident from the equations (1), the amplifier gains are outside the domain of integration and are independent of the wavelength $\lambda$. For this reason, the amplifier gains may be considered separate from the tristimulus values. Thus if the current amplifier gains are represented by $A_{r3}$, $A_{g3}$, and $A_{b3}$ and the resulting tristimulus values by $R_3$, $G_3$ and $B_3$, then the equations (47) below hold. Assuming that color temperature differences are small between the current and the preceding setups and that the outputs $R_3'$, $G_3'$ and $B_3'$ after color matching may be approximated as indicated in the equations (48) below, inserting the equations (47) and (48) into the equations (4) gives the equations (49) below.

$$R_3 = \frac{A_{r3}}{A_{r2}} R_2, \; G_3 = \frac{A_{g3}}{A_{g2}} G_2, \; B_3 = \frac{A_{b3}}{A_{b2}} B_2 \tag{47}$$

$$\dot{R}_3 = \frac{A_{r3}}{A_{r2}} \dot{R}_2, \; \dot{G}_3 = \frac{A_{g3}}{A_{g2}} \dot{G}_2, \; \dot{B}_3 = \frac{A_{b3}}{A_{b2}} \dot{B}_2 \tag{48}$$

$$\begin{aligned}
\dot{R}_3 &= \dot{G}_r R_3 + \dot{O}_r \\
\dot{G}_3 &= \dot{G}_g G_3 + \dot{O}_g \\
\dot{B}_3 &= \dot{G}_b B_3 + \dot{O}_b \\
\dot{G}_r &= f_{gr}\left(\frac{A_{r2}}{A_{r3}} R_3, \frac{A_{g2}}{A_{g3}} G_3, \frac{A_{b2}}{A_{b3}} B_3\right) \\
\dot{G}_g &= f_{gg}\left(\frac{A_{r2}}{A_{r3}} R_3, \frac{A_{g2}}{A_{g3}} G_3, \frac{A_{b2}}{A_{b3}} B_3\right) \\
\dot{G}_b &= f_{gb}\left(\frac{A_{r2}}{A_{r3}} R_3, \frac{A_{g2}}{A_{g3}} G_3, \frac{A_{b2}}{A_{b3}} B_3\right) \\
\dot{O}_r &= \frac{A_{r3}}{A_{r2}} f_{or}\left(\frac{A_{r2}}{A_{r3}} R_3, \frac{A_{g2}}{A_{g3}} G_3, \frac{A_{b2}}{A_{b3}} B_3\right) \\
\dot{O}_g &= \frac{A_{g3}}{A_{g2}} f_{og}\left(\frac{A_{r2}}{A_{r3}} R_3, \frac{A_{g2}}{A_{g3}} G_3, \frac{A_{b2}}{A_{b3}} B_3\right) \\
\dot{O}_b &= \frac{A_{b3}}{A_{b2}} f_{ob}\left(\frac{A_{r2}}{A_{r3}} R_3, \frac{A_{g2}}{A_{g3}} G_3, \frac{A_{b2}}{A_{b3}} B_3\right)
\end{aligned} \tag{49}$$

As described, when the functional relation obtained with the amplifier gains of $A_{r2}$, $A_{g2}$ and $A_{b2}$ is applied to the case in which the amplifier gains are $A_{r3}$, $A_{g3}$ and $A_{b3}$, the tristimulus values $R_3$, $G_3$ and $B_3$ for the gains $G_r'$, $G_g'$ and $G_b'$ as well as for the DC offset values $O_r'$, $O_g'$ and $O_b'$ need to be multiplied by $A_{r2}/A_{r3}$, $A_{g2}/A_{g3}$ and $A_{b2}/A_{b3}$ respectively. Furthermore, the DC offset values $O_r'$, $O_g'$ and $O_b'$ thus obtained need to be multiplied by $A_{r3}/A_{r2}$, $A_{g3}/A_{g2}$ and $A_{b3}/A_{b2}$ respectively.

The white balance must be detected downstream of the color matching circuit 18, and must be adjusted in accordance with the corrected tristimulus values. Where the spectral radiation characteristics of the lighting condition are drastically changed, e.g., where color matching is initially performed outdoors in the sun and then the white balance is readjusted indoors under fluorescent lamps, the correction based on the equations (49) are not expected to be effective.

In the above-described embodiment, the use of rg chromaticity is intended to reduce the number of parameters. It is obvious that uv chromaticity or xy chromaticity may be used instead. However, since the tristimulus values actually obtained through imaging operation do not include negative values and no value will appear outside the triangle in FIG. 4, the use of rg chromaticity is preferred for the simplicity of computations involved.

As described and according to the invention, where a plurality of video cameras making up a video camera system acquire their respective red, green and blue signals through imaging operation, the gains and/or DC offset values of these red, green and blue signals are adjusted for color matching between the configured video cameras in accordance with the levels of their signals. The color matching operation effectively absorbs the color differences between the component video cameras within the system. In addition, one circuit may act both as the color matching circuit and as the linear matrix circuit, whereby the scale of circuitry is reduced.

As many apparently different embodiments of this invention may be made without departing from the spirit and scope thereof, it is to be understood that the invention is not limited to the specific embodiments thereof except as defined in the appended claims.

What is claimed is:

1. A video camera comprising:
level detecting means for detecting the levels of red, green and blue signals obtained through imaging operation; and color matching means for adjusting the gains and/or the DC current offset values of said red, green and blue signals according to one or more coefficients such that the component color characteristics of the camera substantially match the component color characteristics of a reference camera, said coefficients being computed based on the levels of said red, green and blue signals which are detected by said level detecting means and levels of red, green and blue signals detected in said reference camera.

2. A video camera according to claim 1, further comprising a linear matrix circuit for electronically correcting color reproduction errors, wherein both said color matching means and said linear matrix circuit are included in a single circuit.

3. A video camera system comprising a plurality of video cameras connected to a controller:
wherein said plurality of video cameras each include level detecting means for detecting the levels of red, green and blue signals obtained through imaging operation; and color matching means for adjusting the gains and/or the DC current offset values of said red, green and blue signals for each camera according to one or more coefficients such that the component color characteristics of each said camera substantially match the component color characteristics of a reference camera; and wherein for each respective camera other than said reference camera said controller computes said coefficients based on the levels of said red, green and blue signals which are detected by said level detecting means of said respective camera and levels of red, green and blue signals detected in said reference camera.

4. A video camera system according to claim 3, wherein said controller computes said color matching coefficients on the basis of those levels of said red, green and blue signals which are detected by said level detecting means of said plurality of video cameras imaging a common color chart, said color matching coefficients being used by said color matching means of said plurality of video cameras.

5. A color matching method for matching colors between a plurality of video cameras, said color matching method comprising the steps of:

detecting the levels of red, green and blue signals obtained through imaging operation of each of said plurality of video cameras; and controlling color matching means to adjust the gains and/or the DC current offset values of said red, green and blue signals for each said camera according to one or more coefficients such that the component color characteristics of each said camera substantially match the component color characteristics of a reference camera, said coefficients being computed based on the levels of said red, green and blue signals which are detected for said camera and levels of red, green and blue signals detected in said reference camera.

6. A color matching method according to claim 5, wherein the step for level detection detects the levels of said red, green and blue signals obtained by said plurality of video cameras imaging a common color chart.

* * * * *